United States Patent [19]

Johnson et al.

[11] Patent Number: 5,438,968

[45] Date of Patent: Aug. 8, 1995

[54] TWO-CYCLE UTILITY INTERNAL COMBUSTION ENGINE

[75] Inventors: William P. Johnson, Valley Center; Niels J. Beck, Bonita; James A. Pena, Leucadia, all of Calif.

[73] Assignee: BKM, Inc., San Diego, Calif.

[21] Appl. No.: 132,290

[22] Filed: Oct. 6, 1993

[51] Int. Cl.⁶ .................. F02M 41/00; F02M 37/04; F02D 7/00

[52] U.S. Cl. ................... 123/446; 123/467; 123/481; 123/736; 123/509; 239/96

[58] Field of Search .............. 123/446, 447, 73 C, 123/509, 510, 507, 508, 467, 481, 195 R, 193.3, 452, 481; 239/88, 89, 96, 533.8, 585.1

[56] References Cited

U.S. PATENT DOCUMENTS

| Re. 33,270 | 7/1990 | Beck et al. | 123/447 |
|---|---|---|---|
| 1,863,232 | 6/1932 | Woolson | 123/509 |
| 1,890,702 | 12/1932 | Steiner | 239/96 |
| 1,919,286 | 7/1933 | Woolson | 123/508 |
| 2,000,555 | 5/1935 | Becker | 123/508 |
| 2,771,867 | 11/1956 | Peras | 123/481 |
| 2,985,378 | 5/1961 | Falberg | 239/96 |
| 3,464,627 | 9/1969 | Huber | 239/533.8 |
| 3,777,977 | 12/1973 | Regneault et al. | 239/533.8 |
| 3,897,770 | 8/1975 | Mettig et al. | 123/193.3 |
| 4,015,571 | 4/1977 | Stumpp | 123/452 |
| 4,040,395 | 8/1977 | Demetrescu | 123/481 |
| 4,211,202 | 7/1980 | Hafner | 239/96 |
| 4,327,683 | 5/1982 | Banzhaf | 123/452 |
| 4,359,025 | 11/1982 | Zeliszkewycz | 123/294 |
| 4,509,488 | 4/1985 | Förster et al. | 123/481 |
| 4,550,704 | 11/1985 | Barho et al. | 123/481 |
| 4,583,504 | 4/1986 | Morris | 123/145 R |
| 4,798,186 | 1/1989 | Ganser | 123/467 |
| 4,909,440 | 3/1990 | Mitsuyasu et al. | 239/96 |
| 4,993,637 | 2/1991 | Kanesaka | 239/96 |
| 5,038,739 | 8/1991 | Ishii | 123/481 |
| 5,042,718 | 8/1991 | Bergmann et al. | 239/88 |
| 5,048,489 | 9/1991 | Fischer et al. | 123/467 |
| 5,105,779 | 4/1992 | Thompson | 123/481 |
| 5,161,496 | 11/1992 | Matsushima et al. | 123/508 |
| 5,176,120 | 1/1993 | Takahashi et al. | 123/467 |
| 5,211,153 | 5/1993 | Yonekawa et al. | 123/193.3 |

FOREIGN PATENT DOCUMENTS 2254053 5/1974 Germany ................... 123/193.3

OTHER PUBLICATIONS

SAE Paper #841094 Entitled "Two-wheeled Vehicle with Two Stroke Engine And Omission of Active Cycles", Sep. 1984 By Zazula, et al.

Huei-Huay Huang et al., *Improvement of Irregular Combustion of Two-Stroke Engine by Skip Injection Control*, SAE Technical Paper Series No. 922310, Oct. 19–22, 1992.

Ralph J. Hooker, *A Gas-Generator Turbocompound Engine*, ORION, vol. 65, 1957, presented at SAE National West Coast Meeting on Aug. 7, 1956.

Huei-Huay Huang et al., *Study of a Small Two-Stroke Engine with Low-Pressure Air-Assisted Direct-Injection System*, SAE Technical Paper Series No. 912350, Oct. 7–10, 1991.

Huei-Huay Huang et al., *Improvement of Exhaust Emissions from a Two-Stroke Engine by Direct Injection System*, No. 930497, 1993, pp. 29–42.

*Primary Examiner*—Thomas N. Moulis
*Attorney, Agent, or Firm*—Nilles & Nilles

[57] ABSTRACT

In a two-way utility internal combustion engine, method and apparatus employing an accumulator-type fuel injector having an accumulator cavity and a control cavity both of which are pressurized with fuel to about the same pressure, fuel pressure in the accumulator cavity applying upward force on the needle, and fuel pressure in the control cavity applying opposing downward force on the needle. The accumulator and control cavities are pressurized by means of a reciprocating plunger pump wherein the plunger is driven by cam lobe means on the crankshaft, and injection is initiated by venting fuel from said control cavity through a two-way solenoid valve. Injection mass is varied by variation of the ignition timing relative to pump plunger top dead center. Engine power output is varied between full power and idle by skip-firing, which is caused by noninjection of fuel in the engine cylinder during one or more engine crankshaft cycles during a series of a predetermined number of crankshaft cycles.

110 Claims, 12 Drawing Sheets

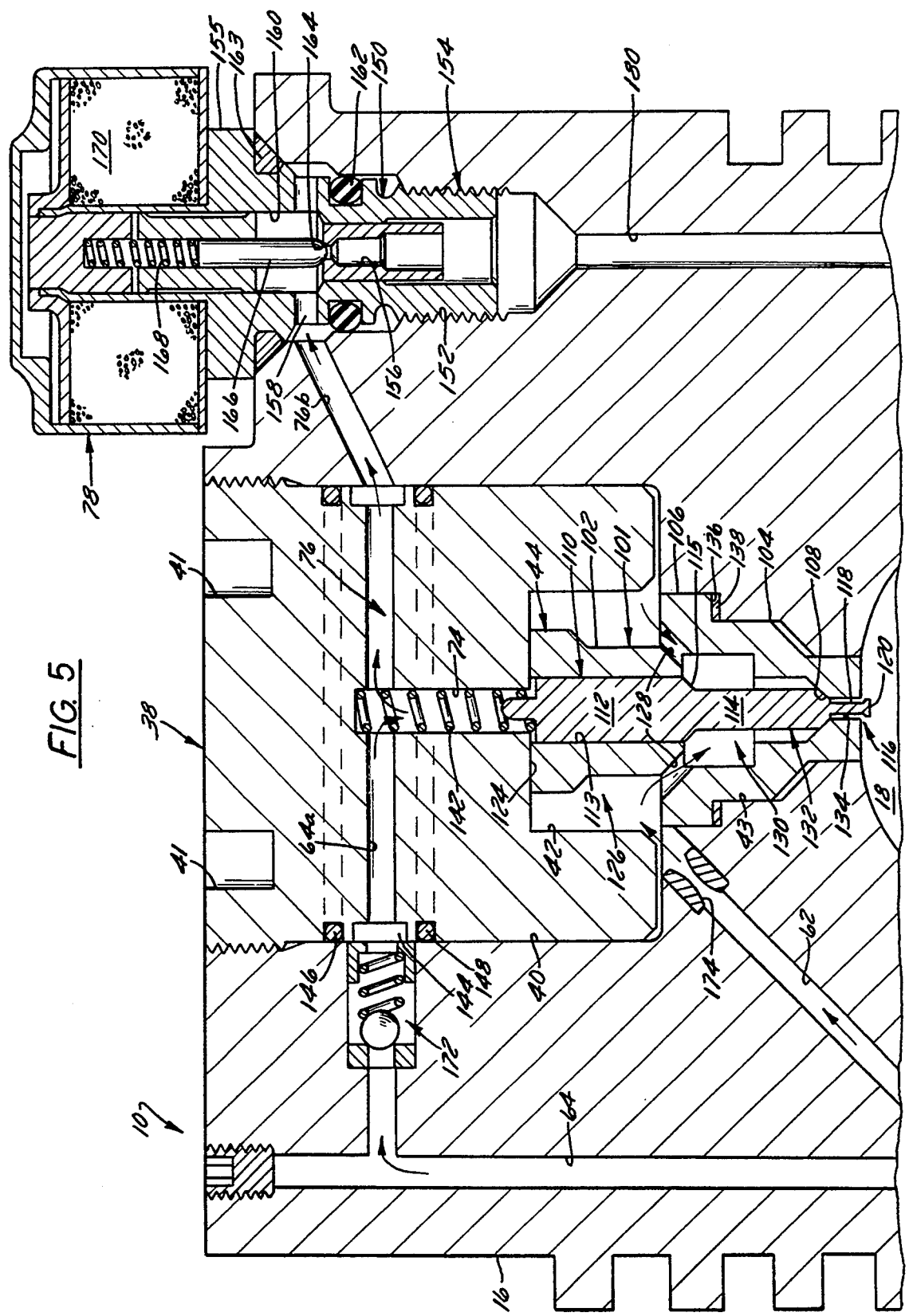

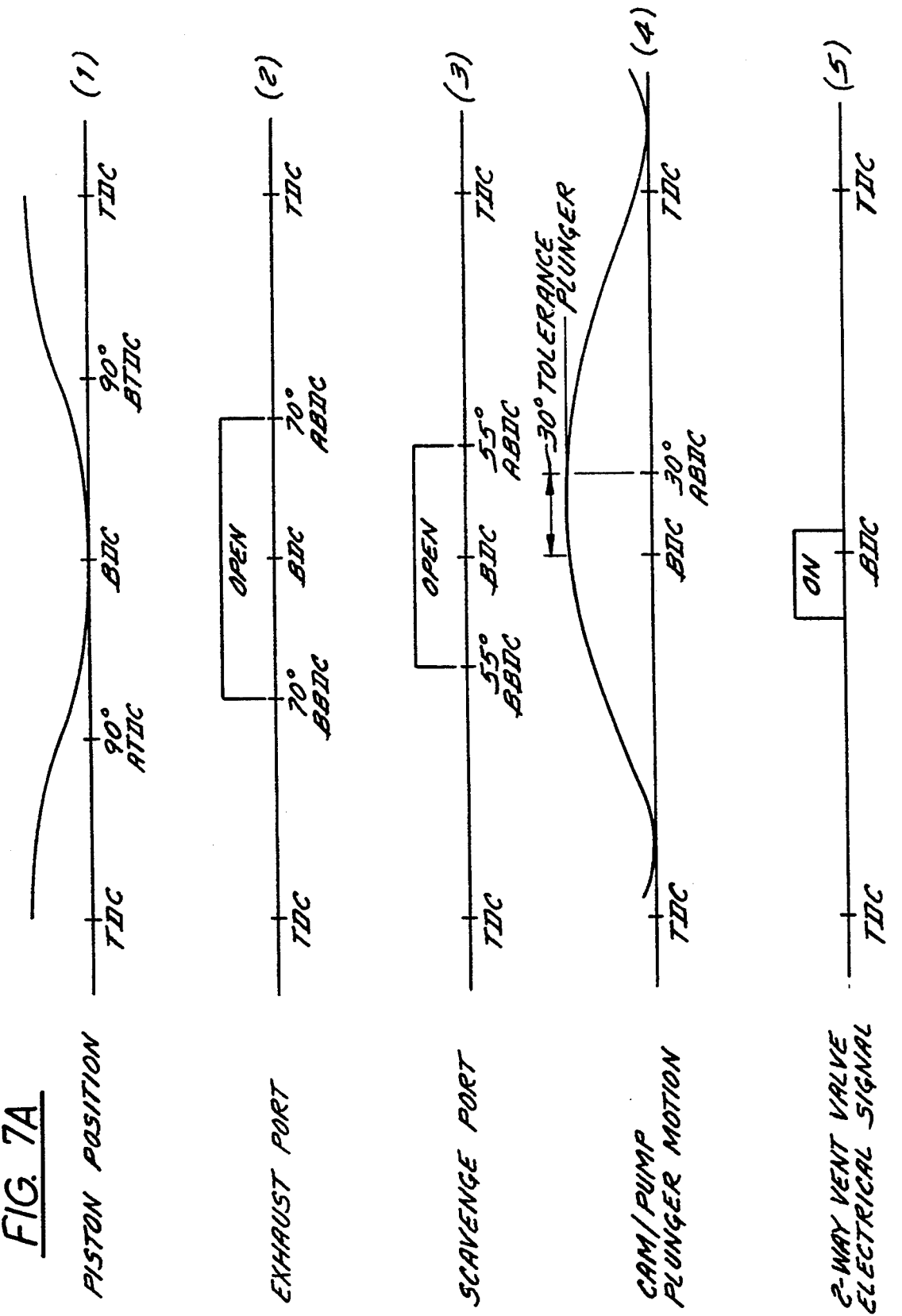

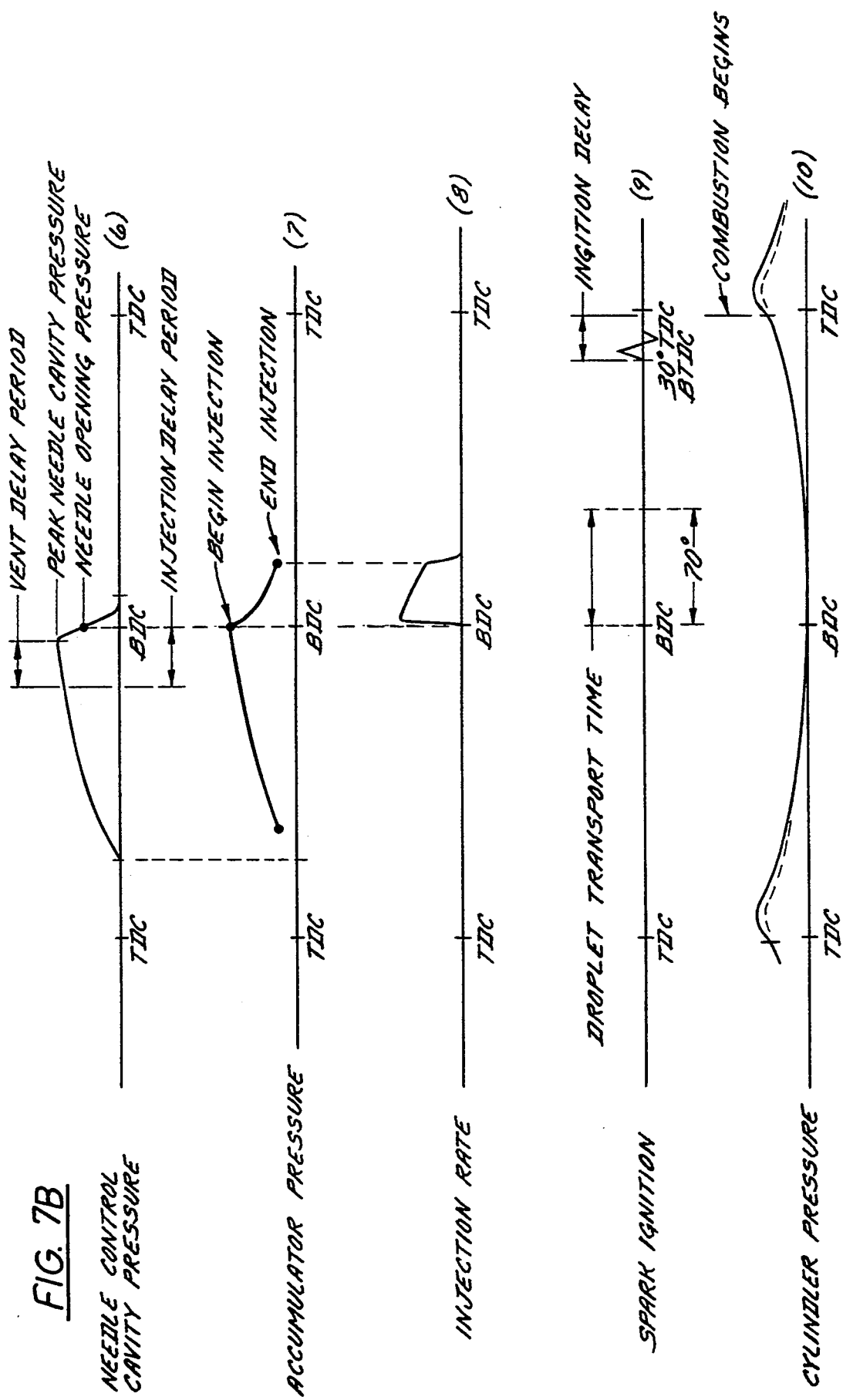

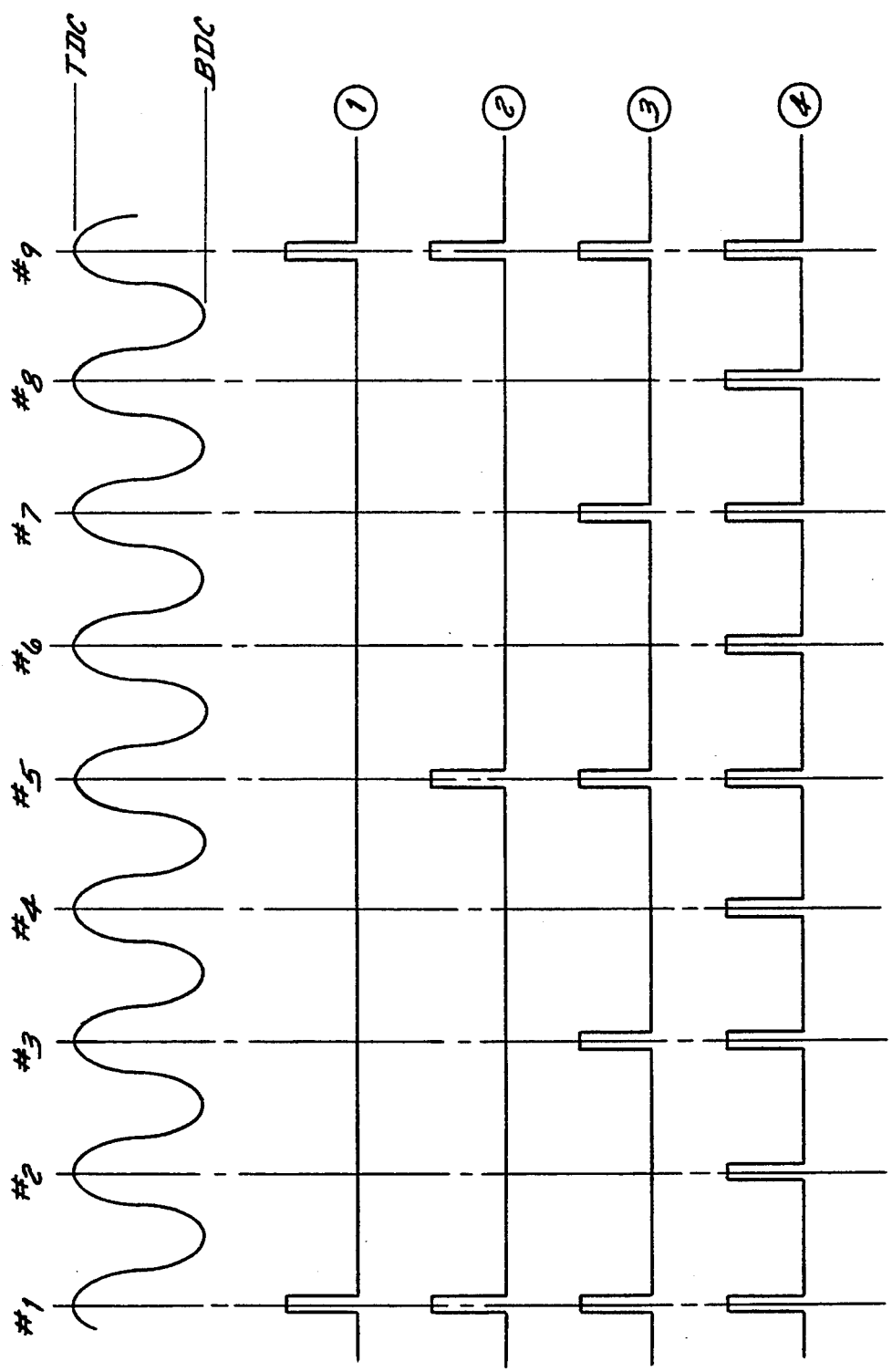
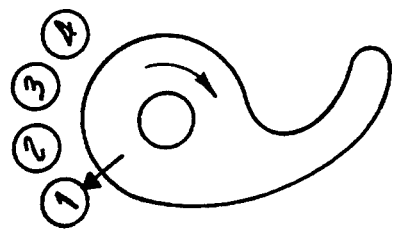
FIG. 8

TWO-CYCLE UTILITY INTERNAL COMBUSTION ENGINE

BACKGROUND OF THE INVENTION

1. Field of the Invention

The present invention relates to two-stroke cycle (hereinafter two-cycle) internal combustion engines, and more particularly, to small utility two-cycle engines.

2. Description of the Prior Art

Small utility-type two-cycle engines are widely utilized today throughout the world for such purposes as nylon line weed trimmers, leaf blowers, chain saws, small tillers, small generator sets, liquid pumps, jet skis, motorbikes and the like. Such small two-cycle engines are normally piston-ported one-cylinder engines which are gasoline fueled through a carburetor.

Such small utility engines in the field today are serious emitters of hazardous atmospheric pollutants, and they are so widespread worldwide that the cumulative pollutant problem is serious. It is applicants' understanding that in 1999 the state of California will begin to enforce very strict exhaust emission standards for this class of engines, and it is also applicants' understanding that no small two-cycle utility engines manufactured anywhere in the world today will be able to approach meeting these new standards. Other states are sure to follow California's example.

This problem of a disproportionate level of hazardous exhaust emissions from small piston-ported two-cycle spark-ignited engines can only be solved by improved combustion over the entire operating range of the engine. Direct, in-cylinder fuel injection can significantly reduce unburned hydrocarbon emissions by timing the injection of fuel in such a way as to prevent the escape of unburned fuel through the exhaust port during the air scavenging process. However, applicants are not aware of any use of direct, in-cylinder fuel injection in small two-cycle utility engines. This is undoubtedly because conventional electronically controlled accumulator fuel injection systems are prohibitively costly and complex for this type of engine. One such prior art fuel injection system is disclosed in Beck et al. U.S. Pat. No. RE 33,270.

Carbon monoxide (CO) emissions primarily result from inadequate oxygen in the combustion process to create $CO_2$ exclusively. In a lean combustion process where excess air is available CO is nearly nonexistent. However, a homogeneous lean mixture can result in incomplete combustion, thereby adding to HC emissions. Introducing some degree of charge stratification can resolve problems of incomplete combustion and inadequate oxygen. In this method, a homogeneous, stoichiometric charge is accompanied by a pocket of excess air to complete the oxidation process. This combustion technique is most easily achieved by short duration, high pressure fuel injection. The diesel engine represents a prime example of applying in-cylinder injection to achieve stratified charge combustion and nearly nonexistent CO emissions. Again, however, such fuel injector systems are prohibitively expensive and complex for small two-cycle utility engines. Applicants are not aware of any such charge stratification in any prior art small piston-ported two-cycle utility engines.

NOx (oxides of nitrogen) is naturally low in piston-ported two-cycle spark-ignited engines due to inherent exhaust gas recirculation and resulting low combustion temperatures. NOx therefore does not present a significant exhaust emissions problem in such two-cycle spark-ignited utility engines.

Another emissions problem of small two-cycle spark-ignited engines involves part load operation in which both the fuel flow and the air flow through the engine are reduced in order to maintain an ignitable air and fuel mixture. The air flow restriction, normally created by throttling, results in increased pumping losses and increased brake specific fuel consumption during part load operation. Also, it is normal for crankcase scavenged two-cycle engines to misfire at part load due to the presence of residual exhaust gas, degraded scavenge efficiency and resulting degraded fuel/air ratio control. This part load misfire contributes to added unburned fuel emissions and increased fuel consumption.

Skip-firing or elimination of some firing cycles to provide idle and part load engine operation could solve this part load emissions problem, provided that there is no fuel introduced into the cylinder during nonfiring cycles of the engine. This precludes a carburetor fuel intake and requires fuel injection, with noninjection causing the skip-firing. Such skip-firing was disclosed in the said Beck et al. U.S. Pat. No. RE 33,270, and also in an SAE technical paper, #841094 dated September 1984, Messrs. S. Zazula et al. suggest omission of active cycles in a two-stroke motorcycle engine. They described a sophisticated test setup, but what they described appeared to be nothing more than a laboratory experiment. The aim of the Zazula et al. article is to show the effects of the omission of active cycles in a one-cylinder two-stroke engine on the vibration characteristics of two-wheeled vehicles.

The foregoing includes all of the most relevant prior art of which applicants are aware.

SUMMARY OF THE INVENTION

In view of these and other problems in the art, it is a general object of the present invention to provide a small two-cycle engine, preferably spark ignited, which is particularly suitable for small utility purposes such as weed trimmers, leaf blowers, chain saws, tillers, generator sets, liquid pumps, jet skis, motorbikes and the like, which has particuarly low levels of hazardous exhaust emissions for small two-cycle engines.

Another general object of the invention is to provide a small two-cycle engine which is particularly simple in construction, and hence economical to produce.

Another object of the invention is to provide a small two-cycle engine of the character described which has a unitary body including the cylinder, head and fuel injector.

Another object of the invention is to provide, in a small two-cycle engine, novel method and apparatus for direct in-cylinder fuel injection which is so simple and economical that it is practical for small two-cycle utility-type engines, where production costs are critical.

Another object of the invention is to provide a fuel injection system suitable for small utility engines which enables accumulator-type fuel injection means to be employed for particularly advantageous high pressure in-cylinder injection with good spray, and hence combustion, characteristics.

Another object of the invention is to provide an accumulator-type fuel injection system for small two-cycle utility engines which does not require use of a three-way solenoid valve as employed in conventional electronically controlled accumulator fuel injection systems and which is too expensive and complex for small utility-type engines.

A further object of the invention is to provide an accumulator-type fuel injection system for small two-cycle utility engines which controls and times the injection events by opening of a simple two-way solenoid valve, and hydromechanically, rather than electronically, delivers compressed fuel into the accumulator cavity and a control cavity above the injector needle, venting of pressurized fuel from the control cavity by the two-way solenoid valve initiating injection.

A further object of the invention is to provide novel high pressure pump means for simultaneously pressurizing the accumulator and control cavities, such pump means embodying a plunger that is reciprocated by cam lobe means on the crankshaft.

Another object of the invention is to provide a small two-cycle engine of the character described wherein the high pressure plunger pump for pressurizing both the accumulator cavity and control cavity with fuel has an output pressure relief valve which opens prior to pump plunger top dead center to establish the peak pressure applied to the accumulator and control cavities, thus providing consistent engine performance for a manufacturing run of engines, while allowing for some manufacturing tolerance on an engine-to-engine basis.

A further object of the invention is to utilize the timing of the two-way solenoid valve relative to increasing pressurization by the pump plunger as it approaches plunger top dead center and lowering of pump pressure as the plunger recedes from its top dead center to control the amount of compressed fuel in the accumulator at the time injection is initiated, and hence control the mass of fuel injected during the injection event.

A further object of the invention is to control power output of a small utility two-cycle engine by skip-firing, wherein full engine power is produced by fuel injection and hence firing during each engine cycle, and reduced engine power is produced by causing nonfiring engine cycles to occur between each firing cycle, the amount of power reduction being determined by the number of nonfiring engine cycles sequenced between each firing cycle; at engine idle there will be only one firing cycle for each of a series of engine rotational cycles, as for example one firing cycle for each eight engine cycles, or one firing cycle for each six engine cycles.

A further object of the invention is to control such skip-fire engine power control through an engine control unit (ECU) employing pulse divider logic circuitry which is responsive to an engine load command input that may be either digital or analog.

A still further object of the invention is to provide electrical power for both ignition and the ECU through either a conventional ignition system for a small two-cycle utility engine which utilizes a magneto, or alternatively a separate generator, both of which can be actuated in association with the engine flywheel.

A still further object of the invention is to provide basic timing for the ECU from peripheral magnet means on the engine flywheel, enabling the ECU to accurately control timing of the solenoid vent valve and hence commencement of injection events relative to crankshaft position.

Yet a further object of the invention is to provide a high pressure accumulator-type fuel injection system for a small two-cycle engine which, for the first time, enables efficient and predictable charge stratification in such a two-cycle engine, for resolving problems of incomplete combustion and inadequate oxygen.

According to the present invention, an accumulator-type fuel injection system is applied to small two-cycle utility-type engines without the need for the usual complex three-way solenoid valve arrangement in which both fuel charging and venting are controlled by the microprocessor and three-way valve. Such a conventional system is disclosed in Beck et al. U.S. Pat. No. RE 33,270. Instead, according to the present invention, a simple two-way solenoid vent valve is employed, and a hydromechanical high pressure fuel pump which employs a reciprocating plunger driven by a cam lobe on the crankshaft provides pressurization for the accumulator injector. This plunger pump simultaneously pressurizes the accumulator cavity and pressurizes a control cavity above the injector needle. According to intermittent electrical commands from an ECU to the two-way solenoid valve, injection events are initiated by venting the pressurized control cavity. Basic timing is provided for ECU pulse divider logic circuitry by an engine speed and position sensor which is actuated by one or more peripheral magnets on the engine flywheel. Skip-firing is employed to vary engine load sequentially between idle and full power, and the skip-firing is controlled by an electrical engine load command input to the ECU pulse divider logic circuitry, this input optionally being either digital or analog.

The high pressure plunger fuel pump produces generally sine wave pressure variation from minimum, which may be substantially atmospheric, up to a predetermined maximum pressure which may be on the order of about 1,000–2,000 psig or even higher for the accumulator and control cavities of the injector. The plunger pump output divides into separate feed conduits for the injector or accumulator cavity and the control cavity, and several forms of the invention provide variations in these two feed conduits which enable variation of the fuel pressure in the accumulator cavity at the time of initiation of injection, and hence corresponding variation of the mass of fuel that is injected. Such injection timing variations and corresponding injected fuel mass utilize output variations of the high pressure pump as the pump plunger is rising toward its top dead center or receding after its top dead center.

In an Option A form (FIG. 4) there is a check valve in the accumulator feed conduit and an orifice in the control cavity conduit which may be variable, whereby accumulator cavity pressure is rising prior to pump plunger top dead center, and is retained at full pressure after plunger top dead center. In this Option A form reduced injection mass can be caused by initiating injection before plunger top dead center, but full injection mass will always occur if injection is initiated proximate or after plunger top dead center. In another, Option B form of the invention (FIG. 5) there is an orifice in the accumulator cavity feed conduit and a check valve in the control cavity feed conduit. With this arrangement pressure will rise in the accumulator cavity as the pump plunger rises toward its top dead center, and fall in the accumulator cavity as the pump plunger recedes after plunger top dead center, while pressure will rise in the control cavity as the plunger rises toward its top dead center, but will be fully retained in the control cavity after pump plunger top dead center. In this Option B form injection mass can be reduced by initiating injection either before or after plunger top dead center, and full injection mass will be achieved by injecting proximate plunger top dead center.

In an Option C form of the invention orifices are provided in both the accumulator cavity feed conduit and the control cavity feed conduit, and injection mass can be reduced by initiating injection either before or after pump plunger top dead center, with full injection mass being achieved by initiating injection proximate pump plunger top dead center. Other forms of the invention are described in detail hereinafter.

For all forms of the present invention it is preferred to employ a pressure relief valve, which is preferably adjustable, in association with the plunger pump output so that a predetermined maximum accumulator pressure will be assured. The pressure relief valve opens close to pump plunger top dead center, and assures the same peak accumulator pressure for all engines from a particular manufacturing run despite manufacturing tolerance variations.

BRIEF DESCRIPTION OF THE DRAWINGS

These and other objects and advantages of the invention will become more apparent from the following Detailed Description and the accompanying drawings, wherein:

FIG. 5,A is a view similar to FIGS. 4 and 5, but more fragmentary, showing the Option C form of the invention, wherein each of the accumulator and control cavity feed conduits has an orifice therein, and neither has a check valve;

FIGS. 7A and 7B show ten diagrams or histograms illustrating and coordinating ten engine functions for a representative example two-cycle engine embodying the invention;

FIG. 8 is a diagrammatic illustration of one skip-firing method according to the invention which provides four engine power output settings ranging from idle to full power;

DETAILED DESCRIPTION

Figure 1:
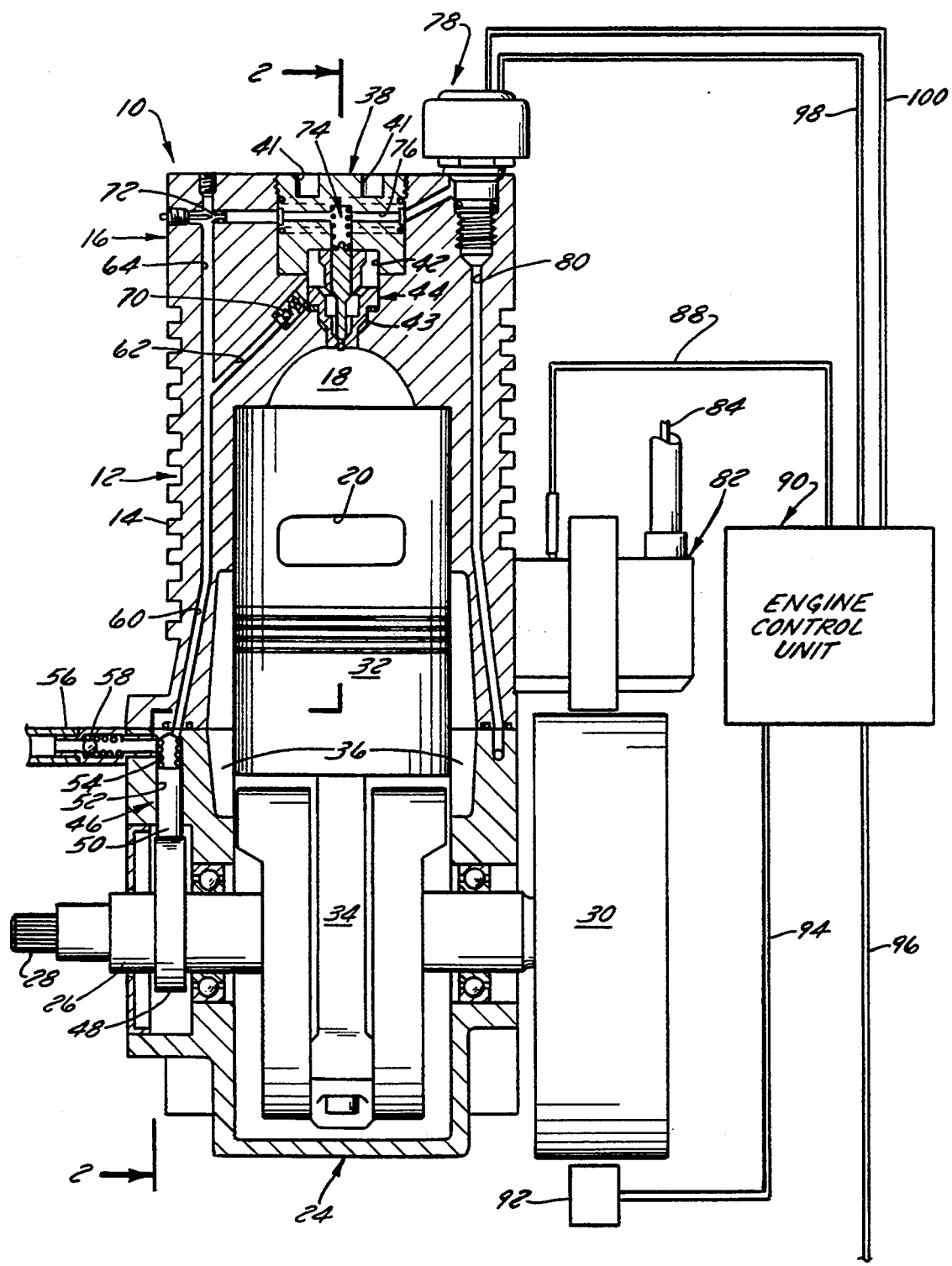
FIG. 1 is a primarily vertical, axial section taken on the line 1—1 of FIG. 2, with portions in elevation and portions diagrammatically shown, illustrating a two-cycle ignition fired engine according to the invention, with hydraulic circuitry in the head portion of the engine in the Option A form of FIG. 4.

Two-stroke cycle (hereinafter "two-cycle") small fuel-injected internal combustion engines embodying the features of the present invention may be provided in several different optional forms as shown in the drawings and described hereinafter, enabling variations to be provided in timing and the quantity of fuel injected, for purposes that will be described in detail with respect to the several optional forms. It is an important aspect of the present invention that the engine be fueled by means of an accumulator-type fuel injector in order to achieve the desired versatiity in both ignition timing and fuel quantity as well as providing the ability to achieve a stratified charge. Two-cycle engines according to the invention may be either spark ignited or compression ignited, spark-ignited engines normally being gasoline fueled, but alternatively fueled by a gaseous fuel such as natural gas, methane, ethane, propane or butane; while compression-ignited two-cycle engines according to the invention will normally be diesel fueled.

The present invention has been developed primarily for small utility-type two-cycle engines, although it is to be understood that the invention is not limited to any particular size two-cycle engine. Examples of some uses currently contemplated for two-cycle engines embodying the present invention, which are given by way of example only and not of limitation, are engines for nylon line weed trimmers, leaf blowers, chain saws, small tillers, small generator sets, liquid pumps for pumping diesel fuel or JP-5 or JP-8 aircraft jet engine fuels, jet skis, motorbikes and the like. The forms of the invention shown and described hereinafter in detail are gasoline-fueled, spark-ignited engines, although as stated above, the invention is not so limited.

Figure 2:
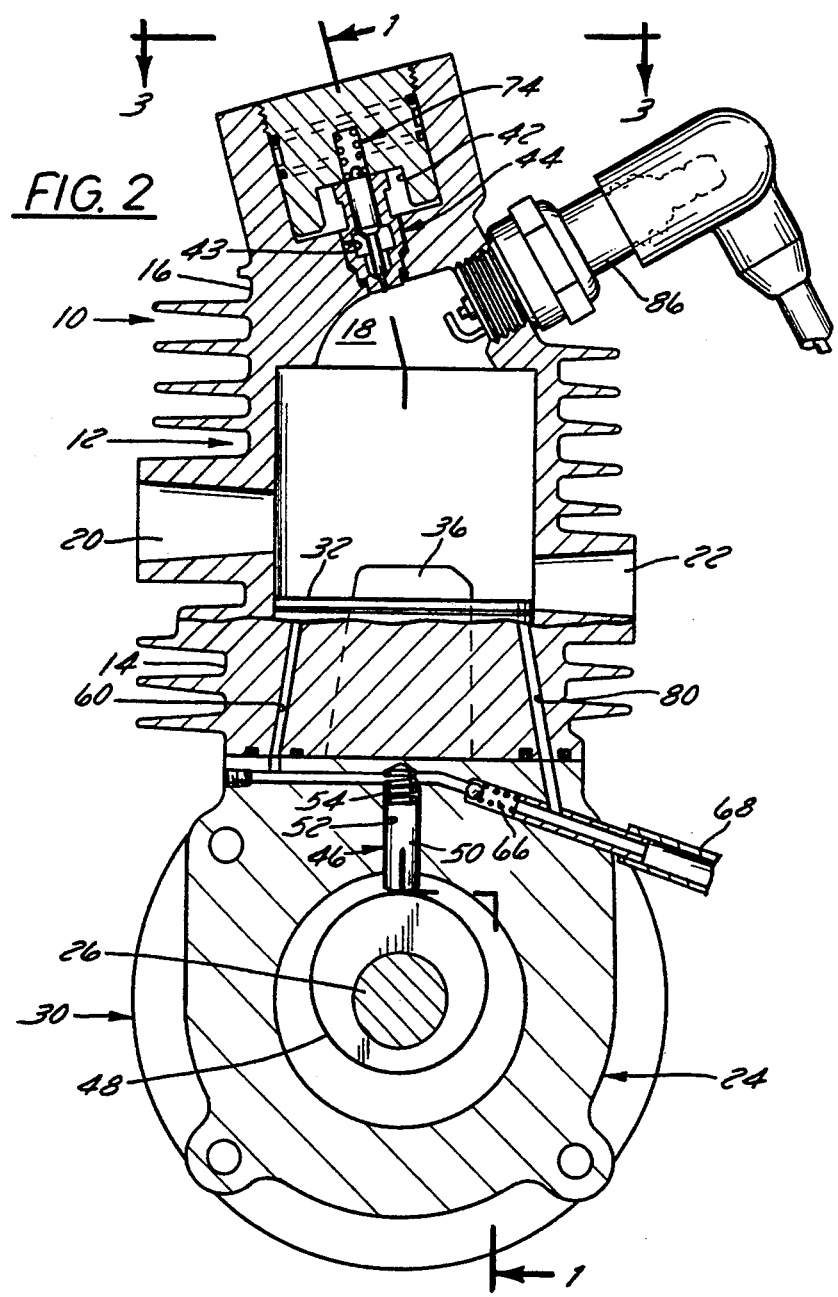
FIG. 2 is a vertical section, with portions in elevation, taken on the line 2—2 in FIG. 1.
Figure 3:
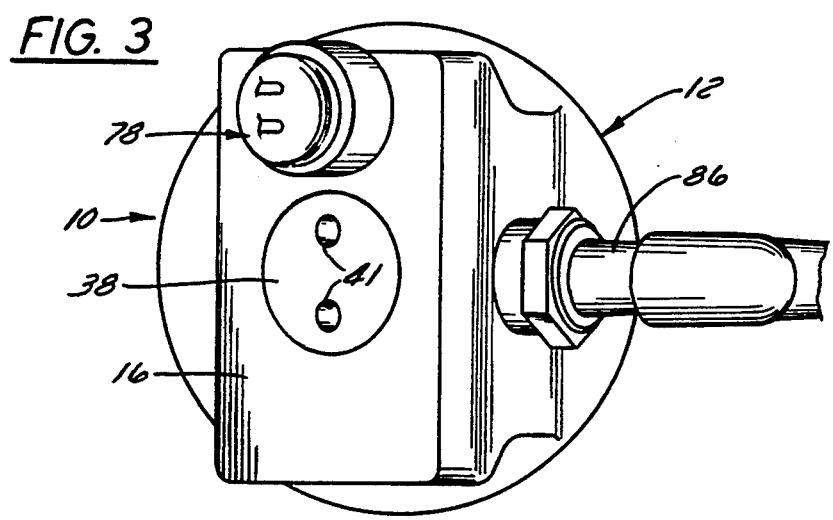
FIG. 3 is a top plan view of the engine taken on the line 3—3 in FIG. 2.
Figure 4:
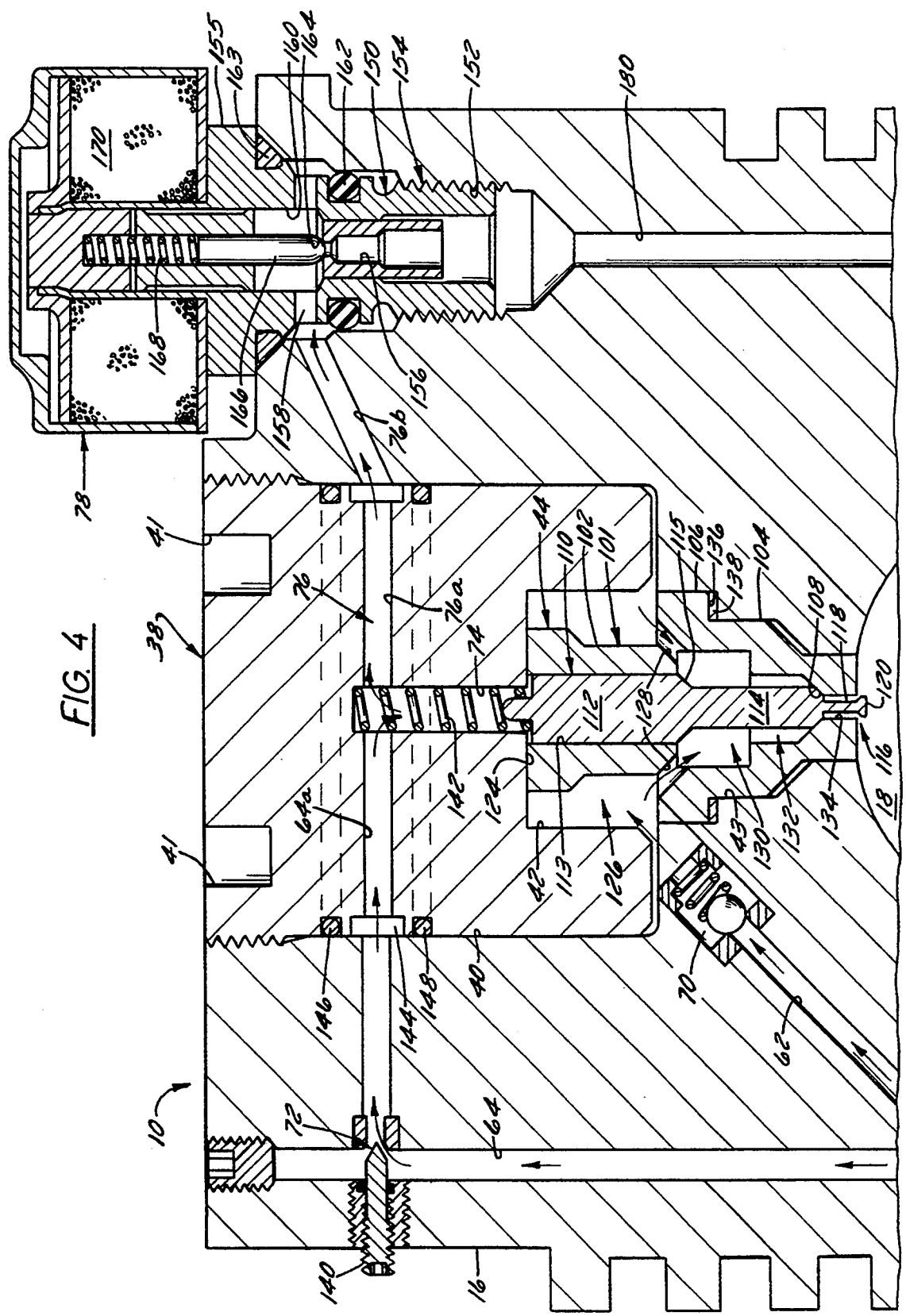
FIG. 4 is a greatly enlarged fragmentary, vertical axial section, with portions in elevation, showing internal details of the engine head construction, including details of the accumulator fuel injector, hydraulic control for the injector, and two-way solenoid valve, for the Option A form of the invention which has a check valve in the accumulator feed conduit and an orifice in the control cavity feed conduit.

The first form of the invention shown and described will hereinafter sometimes be referred to as the "Option A" form, and is illustrated in FIGS. 1-4. FIGS. 1-3 show the overall Option A form of the invention, generally designated 10. FIG. 4 is a greatly enlarged axial sectional view showing internal details of the engine head construction, including details of the accumulator fuel injector, hydraulic control for the injector, and two-way solenoid valve preferably employed in this form of the invention.

Referring at first to FIGS. 1–3, engine 10 has a unitary body 12, preferably an aluminum casting, comprising a cylinder 14 and head 16, head 16 defining combustion chamber 18. Transversely elongated exhaust port 20 extends through the wall of cylinder 14 as best seen in FIG. 2, and also seen in FIG. 1, and diametrically opposed transversely elongated intake port 22 extends through the wall of cylinder 14 axially displaced below exhaust port 20 as seen in FIG. 2. The presently preferred relative locations of exhaust port 20 and intake port 22 are explained in detail hereinafter relative to operation of engine 10.

Crankcase 24 is generally conventionally attached and sealed to the bottom of cylinder 14. Crankshaft 26 is rotatably mounted in suitable lubricated bearings in opposite walls of crankcase 24, and extends through one crankcase wall to a power output end portion 28, and through the opposite crankcase wall for supporting an external flywheel 30. A conventional small utility two-cycle engine piston 32 is axially slideable in cylinder 14, on its downstrokes rotatably driving crankshaft 26 through connecting rod 34. A pair of axially elongated, diametrically opposed air scavenge or transfer port recesses 36 is provided within cylinder 14 and crankcase 24, piston 32 operating in the conventional two-cycle engine manner to compress ignition air within crankcase 24 during its downstroke, releasing this compressed air through scavenge ports 36 proximate the bottom of its downstroke where it uncovers the upper ends of scavenge ports 36 as seen in both FIG. 1 and FIG. 2; the piston then compressing this transferred air within cylinder 14 and combustion chamber 18 during its succeeding compression upstroke, while at the same time producing a partial vacuum within crankcase 24; piston 32 then uncovering air intake port 22 below the piston skirt as piston 32 approaches the top of its compression stroke so that the partial vacuum in crankcase 24 and the lower portion of cylinder 14 will cause aspiration of air through intake port 22 into the lower portion of cylinder 14 and crankcase 24 for compression during the next downstroke of piston 32. Thus, in the usual two-cycle manner, piston 32 serves not only to provide mechanical power to crankshaft 26 during its downstroke after ignition of the fuel/air charge, but as an air pump for the air portion of the fuel/air ignition mixture. Alternatively, scavenge ports 36 may be omitted, and the ignition air may be pumped into cylinder 14 through intake port 22 by external air pump means (not shown).

An externally threaded annular plug 38 is threadedly engaged within a complementary internally threaded annular recess 40 in head 16. A pair of upwardly opening wrenching holes 41 is provided in annular plug 38. A downwardly opening annular recess 42 is provided in the lower portion of threaded plug 38. A stepped annular bore 43 extends through head 16 below head recess 40 in axial alignment with and of smaller diameter than plug recess 42. Accumulator-type fuel injector 44 has its lower portion seated within stepped annular head bore 43 so as to expose the lower end of fuel injector 44 to combustion chamber 18; the upper portion of fuel injector 44 being received within plug recess 42, with injector 44 being clamped in its seated position within stepped bore 43 by the downwardly facing surface in the top of plug recess 42. Details of fuel injector 44 and threaded plug 38 are best shown in FIGS. 4 and 5, and will be described in detail below in connection with FIG. 4.

As seen in FIGS. 1 and 2, a high pressure pump, generally designated 46, for fueling injector 44 and pressurizing the injector needle spring cavity is powered by an eccentric cam lobe 48 on crankshaft 26. For engines according to the invention which are spark ignited and either gasoline fueled or hydrocarbon gas fueled, typical peak pressures for high pressure pump 46 will be on the order of about 1,000–2,000 psig, but may be lower or higher for particular applications. For compression ignition engines according to the invention, such as diesel fueled engines, the peak pressure of high pressure 46 will be much higher, e.g., on the order of about 4,000–20,000 psig.

Pump 46 employs a reciprocating plunger 50 which reciprocates in a plunger cavity 52 in the wall of crankcase 24 according to the contour of eccentric cam lobe 48. Pump plunger 50 is moved upwardly by cam lobe 48 in its compression stroke, and moved downwardly in its intake stroke by means of plunger return spring 54 within cavity 52. Pump 46 receives fuel from a fuel tank through a low pressure intake conduit 56, which has a check valve 58 in it to prevent fuel backflow during compression strokes of plunger 50. Fuel may be supplied to pump 46 through intake conduit 56 at substantially atmospheric pressure; or may be further pressurized to avoid intake cavitation at high speed engine operation, or alternatively for power variability as described hereinafter in connection with FIG. 6B. Pressurized fuel is delivered by pump 46 through a high pressure output conduit 60 which divides into two branches, an accumulator cavity feed conduit 62 and a control cavity feed conduit 64. A pump output pressure relief valve 66 communicates with the head of plunger cavity 52 as seen in FIG. 2, and as described in detail in connection with the diagrammatic illustration of FIG. 6. Pressure relief valve 66 is preferably set to open before top dead center (TDC) of pump plunger 50 so that pressure relief valve 66 positively controls the pressure of fuel delivered to the accumulator cavity and the control cavity 74 to a preset or adjusted amount, as described in more detail hereinafter. The overflow fuel output from relief valve 66 is returned to the fuel tank through a return conduit 68 seen in FIGS. 2 and 6.

Figure 6:
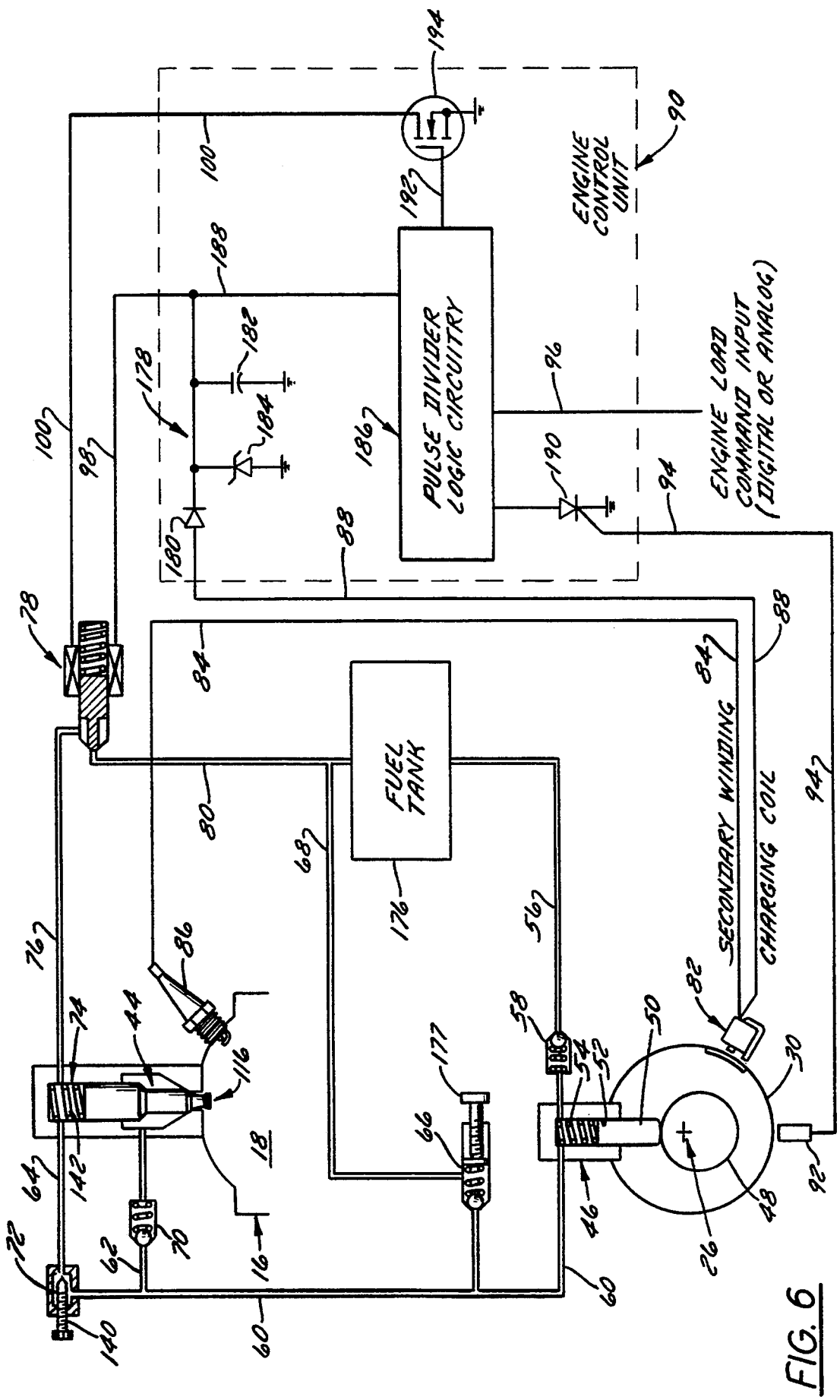
FIG. 6 is a diagrammatic illustration of the entire Option A form of the invention shown in FIGS. 1-4, including the fuel tank and electrical circuitry for powering the ECU and energizing the solenoid valve.

The Option A form of the invention shown in FIGS. 1, 4 and 6 includes a check valve 70 in accumulator cavity feed conduit 62 such that the fuel pressure within the accumulator cavity of injector 44 will, during each pressure stroke of pump plunger 50, reach the pressure level established by pump output relief valve 66 and retain such pressure until injection. Injector spring cavity feed conduit 64 preferably has a restrictive orifice 72 in it to restrict backflow from the spring cavity toward pump 46 if injection is timed to occur after TDC of pump plunger 50 for reasons described hereinafter. Orifice 72 may be manually adjustable for calibration purposes.

The injector spring cavity is generally designated 74, and is normally referred to by applicants as the injector control cavity since release of pressure from within cavity 74 controls the timing of each injection event relative to engine crank angle. Control cavity 74 has a high pressure outlet conduit 76 which leads to a normally-closed two-way solenoid valve 78. Energization of solenoid valve 78 to open it causes communication between control cavity outlet conduit 76 and a solenoid valve vent conduit 80 which leads back to the fuel tank, thereby releasing pressure from within control cavity 74 to precipitate an injection event. Details of injector control cavity 74, its feed conduit 64, its high pressure outlet conduit 76, and two-way solenoid valve 78 are shown in FIGS. 4 and 5, and will be described in connection with FIG. 4.

Engine 10 is shown in the drawings (FIGS. 1 and 6) as having a conventional ignition system for a small two-cycle utility engine, although it is to be understood that alternatively a separate generator and spark coil may be employed. Referring to FIG. 1, the ignition system embodies a magneto generally designated 82 which is energized by one or more permanent magnets peripherally embedded in flywheel 30. Magneto 82 has primary and secondary windings, the secondary winding high voltage output being conducted through a spark plug cable 84 leading to a conventional spark plug 86 seen in FIGS. 2, 3 and 6. The primary winding or a separate charging coil in magneto 82 has a low voltage output conductor 88 which electrically powers an engine control unit (ECU) 90, in which the primary or charging coil electrical output is rectified to power the ECU functions described hereinafter. A Hall effect magnetic engine speed and position sensor 92 is actuated by the embedded magnet or magnets in flywheel 30, and is electrically connected to ECU 90 through a conductor 94. An engine load command input conductor 96 to ECU 90 may be either digital or analog, and can be trigger actuated. The functions of engine load command input conductor 96 will be described hereinafter in detail. Intermittent electrical power is furnished to solenoid valve 78 through conductors 98 and 100.

Referring now particularly to FIG. 4, fuel injector 44 has a unitary cylindrical body 101 consisting of an upper needle guide portion 102 and a lower nozzle portion 104. Body 101 has an axial locating flange 106 for locating injector body 101 within the stepped annular head bore 43. An upwardly and inwardly facing frustoconical needle seat 108 is provided in injector body nozzle portion 104.

The injector needle is generally designated 110, and includes a radially enlarged upper needle portion 112 which has a slideable, sealing fit within a complementary axial bore 113 in needle body guide portion 102, and a reduced lower needle portion 114 which in the lowermost position of needle 110 seats against needle seat 108. There is a bevel transition 115 between needle portions 112 and 114.

While any conventional injector nozzle may be employed in connection with the present invention, applicants have found that a "pintle nozzle" has particularly good spray characteristics for efficient combustion in small two-cycle engines. Such a pintle nozzle is illustrated in FIG. 4, and is generally designated 116. This pintle nozzle includes a small-diameter lower end shank portion 118 of needle 110 which is further reduced from lower needle portion 114, with an enlarged pintle head 120 at the lower end of reduced shank portion 118. This pintle head 120 has a generally upwardly facing frustoconical surface which variably deflects the fuel spray somewhat radially outwardly in combustion chamber 18, which is useful in developing a "stratified charge" during an injection event, as described in detail hereinafter.

The downwardly opening annular recess 42 in threaded plug 38 has a downwardly facing upper end surface 124 which engages the top of injector body 101 to secure body 101 in its seated location in stepped head bore 43. Annular recess 42 in plug 38 and the bottom of head recess 40 define a primary accumulator cavity 126 of injector 44. A plurality of regularly annularly spaced flow channels 128 in injector body 101 lead from primary accumulator cavity 126 to a smaller secondary accumulator cavity 130 within injector body 101, which in turn leads to a diametrically reduced outlet cavity 132 and thence past needle seat 108 to pintle spray orifice 134. Downwardly facing shoulder 136 on injector body flange 106 seats against a sealing gasket 138 which is supported on the first upwardly facing step of stepped head bore 43, and threaded plug 38 is torqued down so as to provide a tight seal at gasket 138.

Referring now to the fuel hydraulic circuit for injector control cavity 74 in plug 38, adjustment for orifice 72 in cavity feed conduit 64 is provided by an adjusting screw 140. A continuing part of the control cavity feed conduit 64 is a feed conduit portion 64a in threaded plug 38 which leads to control cavity 74. Control cavity high pressure outlet conduit 76 is in two continuing sections, a first section 76a within threaded plug 38, and a section 76b within head 16 which leads to solenoid valve 78. The spring within cavity 74 is generally designated 142, and is shown as a helical compression spring compressed between the top of needle 110 and threaded plug 38. An annular groove 144 in the periphery of plug 38 renders alignment of primary cavity feed conduit 64 with its continuation 64a and of high pressure outlet conduit section 76a with section 76b uncritical. The hydraulic fuel circuit for control cavity 74 is sealed by peripheral O-ring seals 146 and 148 in plug 38 on opposite sides of annular groove 144.

Still referring to FIG. 4, details of solenoid valve 78 will now be described. Valve 78 has a generally annular, tubular body 150 which is received within a generally complementary annular upwardly opening cavity 152 in the head casting. Valve body 150 has an externally threaded lower portion 154 which is threadedly engaged within a complementary internally threaded lower section of head cavity 152. Body 150 has a hex head 155 at its upper end for screwing body 150 into position within cavity 152. An axial vent passage 156 extends downwardly through the lower portion of valve body 150 into communication with valve vent conduit 80 which extends downwardly through the head casting and leads to the fuel tank.

Valve body 150 has a transverse high pressure inlet passage 158 in its upper portion which is in communication with control cavity high pressure outlet conduit portion 76b, inlet passage 158 leading to an axial high pressure cavity 160 within body 150. A pair of O-ring seals 162 and 163 provides appropriate sealing for the communication between high pressure conduit section 76b and inlet passage 158, as well as high pressure cavity 160. Annular valve vent port 164 defines communication between high pressure cavity 160 and vent passage 156, and is normally closed by the hemispherically rounded lower end of valve pin 166 which is normally downwardly biased to the closed position by means of valve spring 168 above pin 166. Solenoid coil 170 is located at the top of valve 78, and is normally unenergized. Energization of coil 170 lifts pin 166 off of valve seat 164 to permit rapid escape of pressurized fuel from control cavity 74 through outlet conduit sections 76a and 76b, through valve body inlet passage 158 and valve vent port 164 to vent passage 156 and vent conduit 80, thus rapidly lowering the pressure in control cavity 74 to substantially atmospheric pressure.

Such release of pressure from control cavity 74, and hence from the top of injector needle 110, enables the upward force of hydraulic pressure in secondary accumulator cavity 130 against needle bevel 115 to overcome the downward force of needle spring 142 and lift the needle off of valve seat 108 to cause an injection event to occur. Injection will then continue until pressure in the combined accumulator cavities 126 and 130 is reduced to the point where it is overcome by the downward force of needle spring 142 which then recloses the needle against valve seat 108 in preparation for another cycle of operation of injector 44.

Operation of the Option A Form of FIGS. 1–4

FIGS. 1 and 2 show reciprocating pump plunger 50 at its bottom dead center position (BDC), at the lowest point on eccentric cam lobe 48. Upward movement of plunger 50 from this point caused by rotation of cam lobe 48 will be considered the initiation of an injection cycle. Plunger cavity 52 has been filled with fuel supplied through intake conduit 56 and check valve 58 during the preceding downstroke of plunger 50. As plunger 50 moves upwardly it compresses fuel in plunger cavity 52, high pressure output conduit 60, accumulator cavity feed conduit 62, and through accumulator check valve 70 into primary accumulator cavity 126, through channels 128 into secondary accumulator cavity 130 and outlet cavity 132. At the same time, fuel pressure from the rising plunger 50 is applied from high pressure output conduit 60 through control cavity feed conduit 64, adjustable orifice 72 and feed conduit continuation 64a in plug 38 to control cavity 74, this rising pressure being simultaneously applied through control cavity high pressure outlet conduit sections 76a and 76b and solenoid valve high pressure inlet passage 158 to high pressure solenoid valve cavity 160, the closed solenoid valve 78 holding the rising pump pressure within the aforesaid hydraulic system in engine head 16.

Before pump plunger 50 reaches its TDC position on cam lobe 48, pump output pressure relief valve 66 will open to the extent required to establish a predetermined, fixed pressure within the entire hydraulic system pressurized by high pressure pump 46. That predetermined, fixed pressure will be retained by accumulator check valve 70 within the accumulator cavities until an injection event is precipitated by opening of solenoid valve 78.

There are advantages for initiating the injection event prior to pump plunger TDC, proximate plunger TDC, and after plunger TDC, which will be pointed out later in the Description. If the injection event is caused to occur before plunger TDC and before pump output pressure relief valve 66 has opened, then the injection event will occur when there is a reduced pressure within the accumulator cavities (i.e., below maximum possible pressure), resulting in a reduced injected mass of fuel. On the other hand, if the injection event is caused to occur before plunger TDC at or after the time pressure relief valve 66 opens, then maximum pressure will be achieved within the accumulator cavities, and a maximum fuel mass will be injected.

If the injection event is caused to occur before pump plunger TDC and before pressure relief valve 66 has opened, pressure will still be rising in control cavity 65 feed conduit 64, and if flow through control cavity feed conduit 64 were unrestricted, then such unrestricted continued pressurization in the control cavity zone might interfere with the capability of solenoid valve 78 to vent pressure from control cavity 74 fast enough to create a clean lifting of the needle. Placement of restricting orifice 72 in feed conduit 64 limits the rate of pressurizing fuel flow input to cavity 74 so that it does not materially interfere with the venting capability of solenoid valve 78 during such venting before pressure relief valve 66 opens. Another cooperative factor in this regard is that the rate of increasing pressurization by pump plunger 50 is relatively small in this injection situation prior to opening of pressure relief valve 66 because of the generally sine curve nature of pump plunger movement as it is approaching its TDC.

If the injection event is caused to occur proximate pump plunger TDC after pressure relief valve 66 has opened, then pressure is no longer rising in control cavity feed conduit 64, so that there would be less need for the presence of orifice 72. Similarly, if the injection event is caused to occur after pump plunger TDC and after pressure relief valve 66 has again closed, then pressure is falling in feed conduit 64, so that again there would be less need for orifice 72.

The FIG. 4 Option A form is the presently preferred form of the invention.

Skip-Firing

The presently preferred method for varying engine power is by skip-firing. This method for controlling engine power was disclosed in Beck et al. U.S. Pat. No. RE 33,270, and covered by claims 2, 56, 57 and 68 of that patent. According to this method, full engine power is achieved by firing on each engine cycle. Reduced engine power is produced by causing nonfiring engine cycles to occur between each firing cycle, and the amount of power reduction is determined by the number of nonfiring engine cycles sequenced between each firing cycle. At engine idle there will be only one firing cycle for each of a series of engine rotational cycles, as for example one firing cycle for each eight engine cycles, or one firing cycle for each six engine cycles. Two such skip-firing method sequences are disclosed in FIGS. 8 and 9, and will be described in detail in connection with those figures.

Skip-firing according to the invention is controlled by solenoid valve 78, and in the FIGS. 1–4 Option A form of the invention, nonfiring cycles are caused to occur by not energizing solenoid valve 78 and thereby not venting high pressure from control cavity 74 to cause an injection event. The reduced orifice 72 in feed conduit 64 limits backflow of fuel toward pump 46 when solenoid valve 78 thus remains closed during an engine cycle such that sufficient pressure is maintained in control cavity 74 to avoid an injection event. The partial backflow of fuel from control cavity 74 through feed conduit 64 to pump 46 during downstrokes of plunger 50 in nonfiring cycles returns compression energy to pump 46, so that the only energy losses during nonfiring cycles are minor friction and heat losses.

Option B Form of FIG. 5

The Option B form of FIG. 5 is identical to the Option A form of FIGS. 1–4 with the exception of the high pressure inputs to the accumulator cavities and the control cavity. Thus, in place of the Option A restricted orifice 72 in control cavity feed conduit 64, there is a check valve 172 in feed conduit 64; and in place of the Option A check valve 70 in accumulator cavity feed conduit 62, there is a restricted orifice 174. Otherwise, all parts are the same and are so numbered in the FIG. 5 Option B form of the invention.

Orifice 174 in accumulator cavity feed conduit 62 is important where the accumulator volume is small for small engines that require a small fuel delivery. Without the check valve in accumulator feed conduit 62, the actual accumulator volume will include not only accumulator cavities 126 and 130, but also the volume of the passages from the plunger pump to both the accumulator cavities and the control cavity check valve. Nevertheless, with restrictive orifice 174 in accumulator cavity feed conduit 62, the "effective" accumulator volume is limited to substantially the volumes of accumulator cavities 126 and 130 during injection. Orifice 174 serves to limit the fuel expansion, or pressure drop, occurring in the feed passageways during the period of injection. During the period of injection the pressure in accumulator cavities 126 and 130 will drop rapidly, resulting in sufficient pressure decay in accumulator cavities 126 and 130 to result in needle closure, prior to substantial decay of pressure in the feed passageways.

The Option B form of FIG. 5 provides the capability of widely varying the injected fuel mass by early timing of the injection event to occur substantially before TDC of pump plunger 50, timing the injection event to occur proximate plunger TDC, or late timing of the injection event to occur substantially after TDC of pump plunger 50. With such early timing, pressures will be simultaneously rising in accumulator cavities 126 and 130 and in control cavity 74, and early energization of solenoid valve 78 to vent pressure from control cavity 74 will cause injection to occur before full pressure is reached in the accumulator cavities, thereby reducing the injected fuel mass. Variation of such early timing can be used to vary the injected mass.

After TDC of pump plunger 50 the peak pressure will be maintained in control cavity 74 to prevent injection during the downstroke of pump plunger 50, while at the same time the reducing pump pressure during such pump plunger downstroke enables fluid to backflow out of the accumulator chambers through accumulator feed orifice 174, thus reducing the fuel pressure in the accumulator chambers and hence the mass of injected fuel when solenoid valve 78 is energized to vent the pressure from control cavity 74 to cause the injection event. Again, the injected fuel mass can be varied by varying the after TDC pump plunger timing at which solenoid valve 78 is energized.

Figure 10:
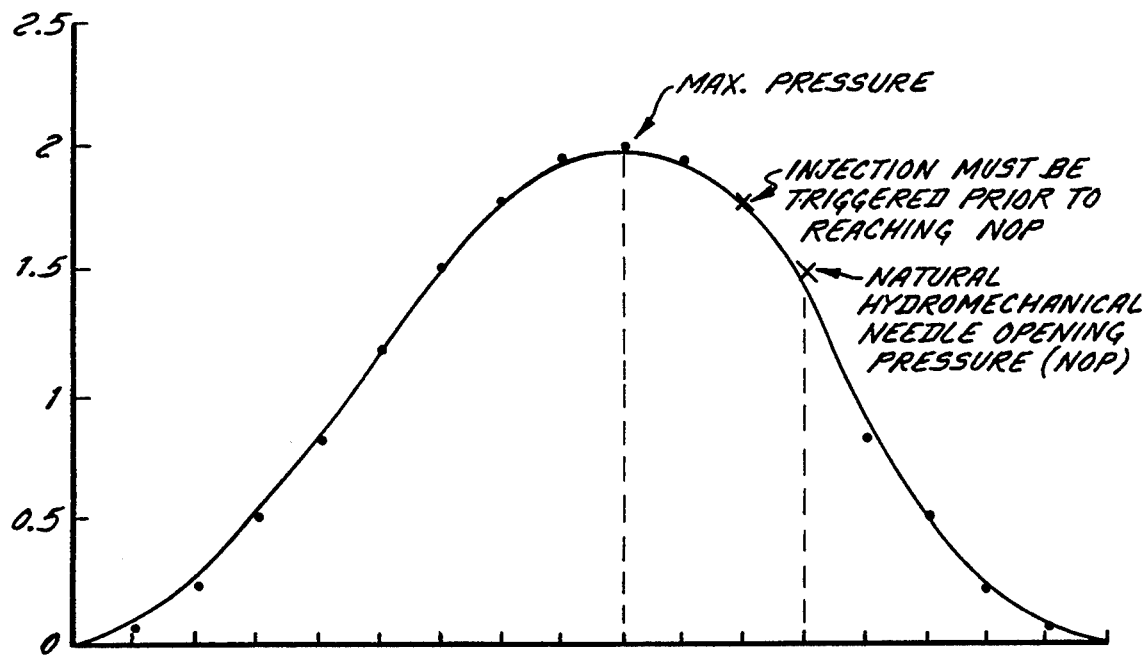
FIG. 10 is a graph having a single curve plotting high pressure pump plunger motion or control cavity pressure against time for the FIG. 4 Option A form of the invention.

FIG. 10 shows a plot of either motion of pump plunger 50 or pressure in control cavity 74, and relates to the FIG. 4 Option A form of the invention in which there is no check valve in control cavity feed conduit 64. The scale on the left side of the graph is in thousands of pounds psig, and is given by way of example only, and not of limitation. The sine curve of FIG. 10 is a plot of plunger motion or control cavity pressure vs. time, and is representative of pump plunger motion, but would have a flattened top for control cavity pressure because of pressure relief valve 66. Injection may be triggered either before maximum pressure, proximate maximum pressure, or after maximum pressure. If after maximum pressure, then injection must be triggered prior to reaching natural hydromechanical needle opening pressure (NOP) when pressure in the control cavity has receded during downward motion of the pump plunger to the point where upward force of accumulator pressure on the injector needle overcomes the combined downward force on the needle of pressure in the control cavity and the needle spring.

Figure 11:
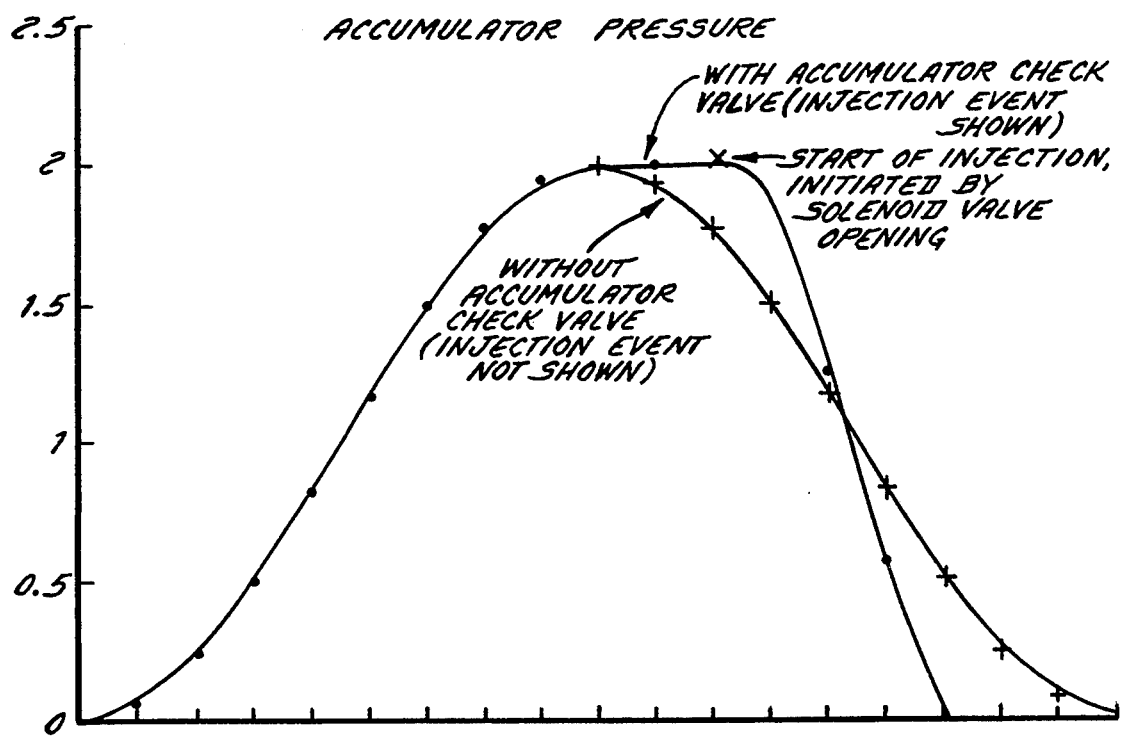
FIG. 11 is a graph which includes two curves plotting accumulator pressure against time, the two curves overlapping in the rising pressure zone, and separating in the falling pressure zone, the generally sine wave pressure curve being for the FIG. 5 Option B form of the invention, and the curve having the flattened top and rapidly falling pressure being for the FIG. 4 Option A form of the invention.

FIG. 11 shows two graphs, both starting with the rising half of a sine wave, again with the scale on the left in thousands of pounds psig given by way of example only, and not of limitation. The complete sine wave curve in FIG. 11 is a plot of accumulator pressure vs. time for the FIG. 5 Option B form of the invention in which accumulator feed conduit 62 has an orifice 174 therein and not the check valve 70 of FIG. 4. In the FIG. 5 form with check valve 172 in control cavity feed conduit 64 there is no NOP, and injection can be triggered at any desired time before plunger TDC, proximate plunger TDC, or after plunger TDC, so long as the upward force of accumulator pressure on the needle is greater than the downward force of the needle spring on the needle. The curve in FIG. 10 with the flattened top applies to the FIG. 4 form of the invention where accumulator cavity feed. conduit 62 will hold maximum pressure in the accumulator cavity after pump plunger TDC because of its check valve 70, and for this curve injection has been initiated substantially after pump plunger TDC, injection being indicated by the sharp drop of this curve during injection.

Figure 5A:
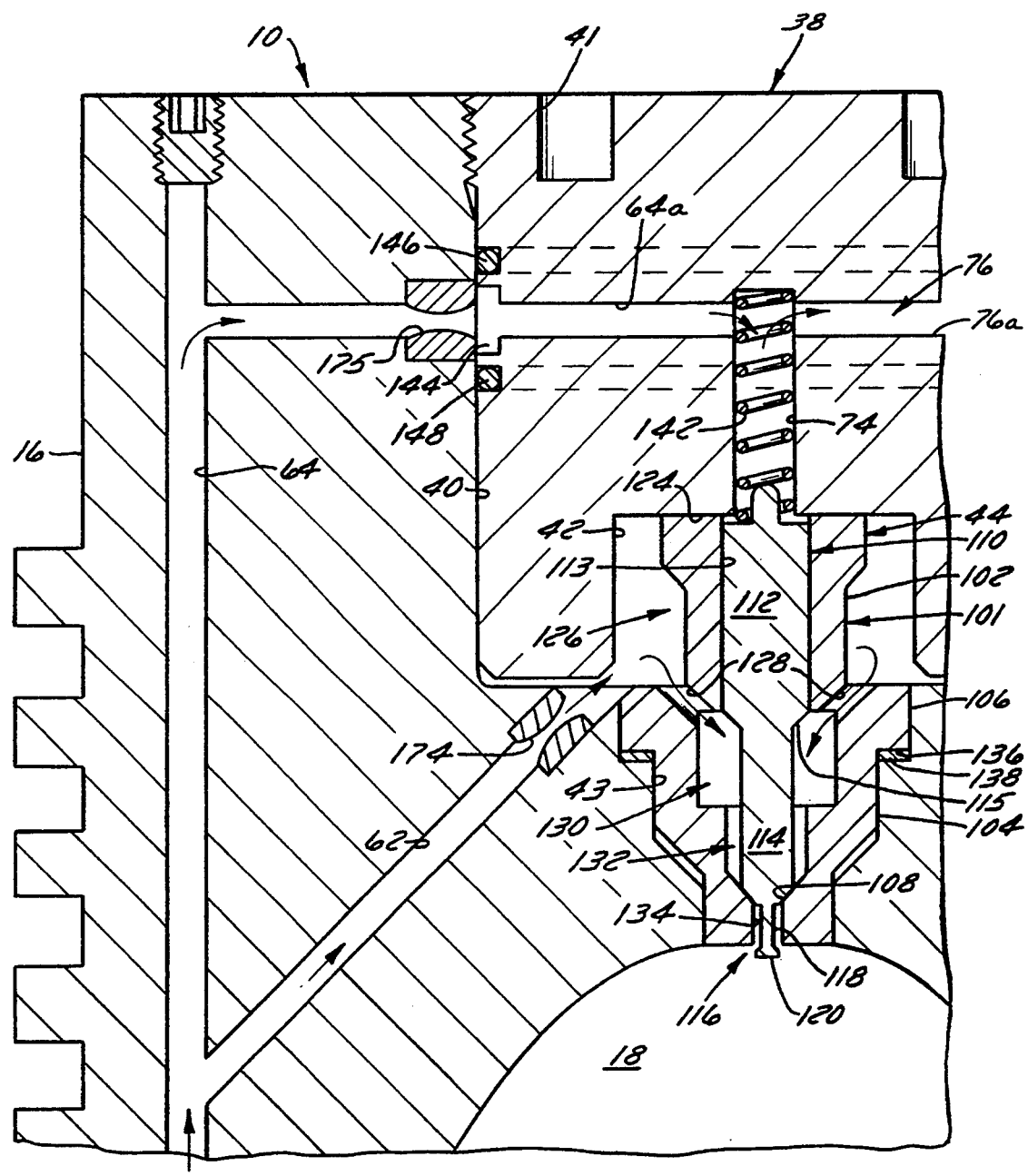
FIG. 5 is a view similar to FIG. 4 but shows the Option B form in which the accumulator feed conduit has an orifice therein, and the control cavity feed conduit has a check valve therein.

Option C Form of FIG. 5A

An Option C form of the invention is shown in FIG. 5A, which is the same as the Option B form of FIG. 5 except that a restrictive orifice 175 replaces check valve 172 of FIG. 5 in control cavity feed conduit 64, and the timing for solenoid valve 78 may be entirely different than in the Option A and Option B forms. Here, as in both the Options A and B forms, during injection cycles solenoid valve 78 is caused to remain unenergized and closed during the pressurization strokes of pump plunger 50, and injection is caused to occur by energization and opening of solenoid valve 78 to release pressure from control cavity 74. Such venting of control cavity 74 to cause injection also releases pressure from the hydraulic circuit back to pump 46, so it is necessary to have accumulator orifice 174 sufficiently small to slow down consequent venting of accumulator cavities 126 and 130 so as to assure sufficient accumulator pressure to cause needle lifting and injection. Preferably, accumulator orifice 174 is substantially smaller than control cavity orifice 175. The Option C form of the invention enables a wide variation of the injected fuel mass by timing the injection event to occur before TDC of plunger 50 and opening of pressure relief valve 66, and hence before the accumulator cavities are fully pressurized; proximate TDC when the accumulator cavities are fully pressurized; or after plunger TDC and after pressure relief valve 66 has reclosed, but before the pressure in control cavity 74 has become reduced to the point where injection would be caused, when the accumulator cavity pressure has become substantially reduced.

Skip-fire cycles may be caused in the Option C form of FIG. 5A by keeping solenoid valve 78 open during the entire cycle, so that fuel pumped through the entire hydraulic circuit is released through solenoid valve 78 and returned back to the fuel tank, and pressure is never allowed to build in either the accumulator cavities or control cavity 74, and needle spring 142 holds needle 110 in its seated position during the entire nonfiring event. This is a reversal of the operation of solenoid valve 78 in the Options A and B forms, where skip-firing is caused by keeping solenoid valve 78 closed during skip-firing cycles. This mode of operation of the Option C form substantially eliminates work required of plunger pump 46 during nonfiring cycles. Alternatively, skip-firing in the Option C form may be caused to occur in the same way as in the Options A and B forms, namely by keeping the solenoid valve closed during skip-firing cycles.

Options D and E Forms of the Invention

An Option D form of the invention may be provided wherein the structure is the same as that of FIGS. 4 and 5, except that both accumulator feed check valve 70 of FIG. 4 and control cavity feed check valve 172 of FIG. 5 are provided, and the restricted orifices may be omitted from both accumulator cavity feed conduit 62 and control cavity feed conduit 64. In this case, after pressure relief valve 66 opens, peak pump pressure will remain in both the accumulator cavities and control cavity 74, so that if solenoid valve 78 is opened to cause an injection event to occur after pressure relief 66 opens, a maximum fuel mass will be injected. If solenoid valve 78 is opened to cause an injection event before pressure relief valve 66 opens, the accumulator pressure and hence injected fuel mass may be variably controlled at less than maximum according to the injection timing before valve 66 opens.

In an Option E form of the invention solenoid valve 78 may be omitted, thus reducing the production cost, and the control cavity high pressure outlet omitted, either by leaving out high pressure outlet conduit section 76a and replacing it with a solid wall of threaded plug 38, or leaving out high pressure outlet conduit section 76b, and blocking section 76a with a solid wall of the head. In this case injection is caused to occur after TDC of pump plunger 50 during the downstroke of plunger 50 as pressure recedes in control cavity 74 to a point where pressure in the accumulator cavities can overcome such control cavity pressure and the force of needle spring 142. For this purpose it is preferred to leave out any orifice in control cavity feed conduit 64, or at least have only a slight amount of orifice in feed conduit 64, to allow free backflow of pressurized fluid from control cavity 74 to pump 46. If maximum accumulator pressure and hence maximum injection mass is desired, then accumulator feed conduit check valve 70 of FIG. 4 is employed. If less than maximum accumulator pressure and hence less than maximum injection mass are desired, then a considerably restrictive orifice 174 (FIG. 5) may be placed in accumulator cavity feed conduit 62 so that pressure in the accumulator cavities will bleed off much more slowly than pressure in control cavity 74 and the injection event will still occur. Thus, the Option E form of the invention is entirely hydro-mechanical in operation.

In this Option E form without the aid of solenoid valve 78, skip-firing will not be enabled and engine power must be controlled by other means, which may be one or more of three such control means disclosed herein. The first such power control has been described immediately above, which is utilizing an orifice in accumulator feed conduit 62 to allow some of the accumulator pressure to bleed off before the injection event occurs.

Figure 6A:
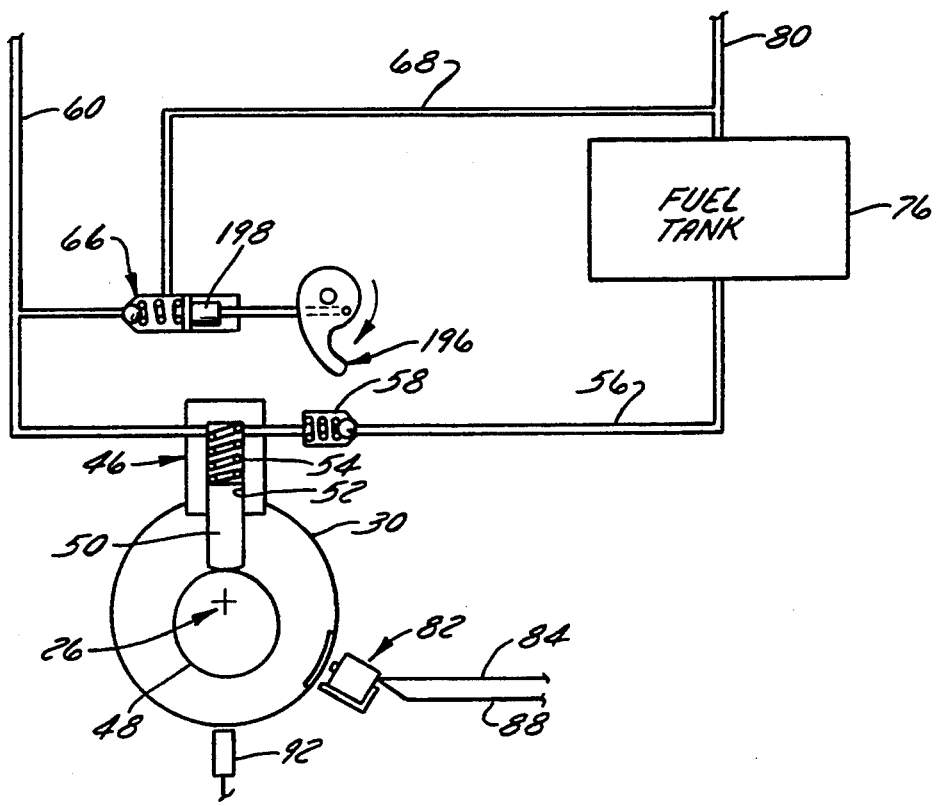
FIG. 6A is a fragmentary view of a portion of FIG. 6, which includes manual relief valve adjustment means in the form of a trigger actuator for adjusting the high pressure pump pressure relief valve so as to, in effect, vary the rail pressure supplied to both the accumulator and control cavities.

A second means for varying the accumulator pressure and hence the injection mass and engine power, shown in two forms in FIGS. 6 and 6A, is adjustment of pump output pressure relief valve 66 to, in effect, vary the rail pressure supplied to both the accumulator cavities and control cavity 74. Such adjustment may be accomplished by varying the force of the relief valve spring on the valve ball, and the adjustment can be either manual or automatic. FIG. 6 shows manual relief valve adjustment means in the form of adjustment screw 177. FIG. 6A illustrates manual relief valve adjustment means in the form of a trigger actuator 196 for varying the force of a plunger 198 against the valve spring. Alternatively, a valve adjustment screw like the adjustment screw 177 shown in FIG. 6 may be motor driven according to instructions from ECU 90 through suitable electrical conductor means.

Figure 6B:
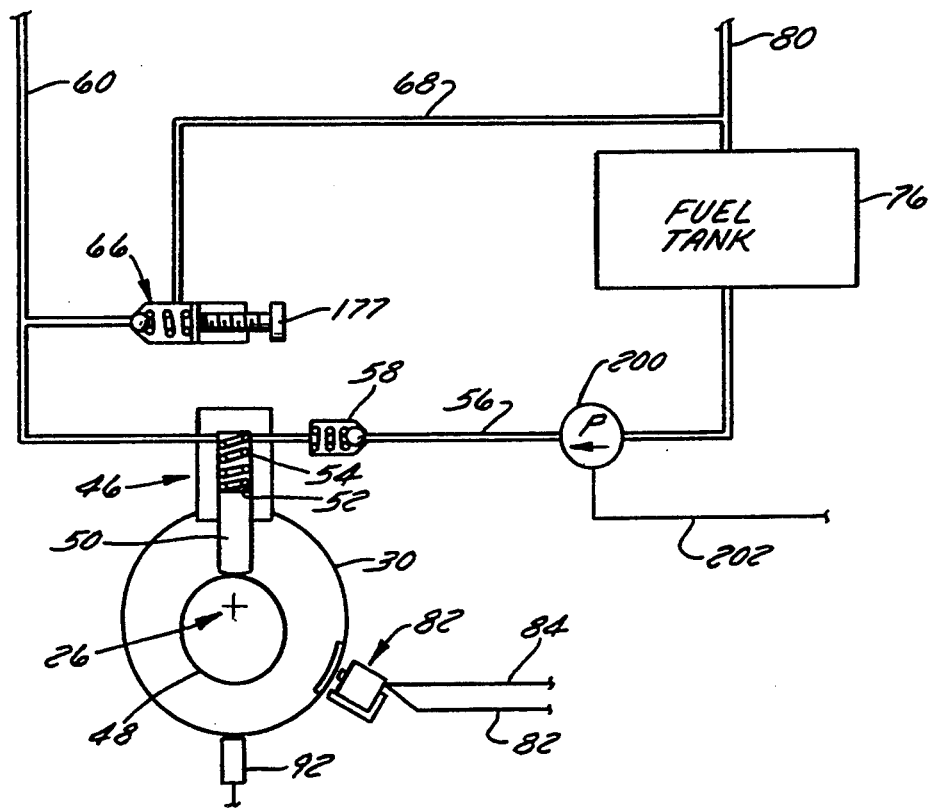
FIG. 6B is a fragmentary diagrammatic view similar to FIG. 6A, but in which a variable fuel transfer pump controlled and electrically powered by the ECU is placed in the fuel inlet conduit to the high pressure plunger pump, for variable raising of the pressure supplied to the accumulator and control cavities.

A third means for varying the accumulator cavity pressure, shown in FIG. 6B, involves placing an adjustable fuel transfer pump 200 in intake conduit 56, which will permit variable raising of the pressure supplied to the accumulator cavities and control cavity 74 from a minimum supplied by pump 46 (which may be reduced from its outlet pressure for the other forms, and which would also be variable by its adjustable pressure relief valve 66 of FIGS. 6 or 6A) to a combined pressure supplied by both the added transfer pump for intake conduit 56 and the cam-actuated pump 46. For the sake of economy, fuel transfer pump 200 may be a simple pump similar to conventional small diaphragm carburetor pumps. Fuel transfer pump 200 can be powered by ECU 90 through a conductor 202 and may be adjustable by the ECU or by means of a trigger actuator.

FIG. 6 Diagram of the Option A Embodiment of the Invention

FIG. 6 diagrammatically illustrates the entire Option A form of the invention shown in FIGS. 1-4, including the fuel tank, and electrical circuitry for powering ECU 90 and energizing solenoid valve 78. Elements of the invention not previously identified by number will be specifically described in connection with FIG. 6.

The fuel tank is designated 176, and is shown to be connected through pump low pressure intake conduit 56 and check valve 58 to plunger cavity 52 of high pressure pump 46. Manual adjustment for the pressure supplied by pump 46 to its high pressure output conduit 60 is provided by means of an adjustment screw 177 forming a part of pump output pressure relief valve 66. Pressure relief valve 66 is a check valve, and adjustment of screw 177 varies the force of the check valve spring on the check valve ball for varying the pump output pressure.

The two electrical output conductors from magneto 82 are the secondary winding output conductor 84 leading to spark plug 86, and charging coil output conductor 88 which leads to ECU 90. The charging coil may be a separate charging coil in magneto 82, or may be the primary winding of magneto 82, provided the electrical circuitry of ECU 90 and solenoid valve 78 do not overload the primary winding of magneto 82 and thereby interfere with the spark plug-energizing function of the secondary winding.

Charging coil conductor 88 leads to a rectifier circuit generally designated 178 which rectifies the alternating charging coil output voltage to DC. The pulsating charging coil current is rectified by a diode 180 and charges a capacitor 182 to the desired DC voltage level, which is determined by a zener diode 184. Although any desired voltage may be provided, typically it will be 12 volts or 28 volts. This rectified current is delivered to pulse divider logic circuitry 186 through a conductor 188. The intermittent output current from the Hall effect engine speed and position sensor 92 is supplied through conductor 94 and a gated diode (SCR) 190 to the pulse divider logic circuitry 186.

Figure 9:
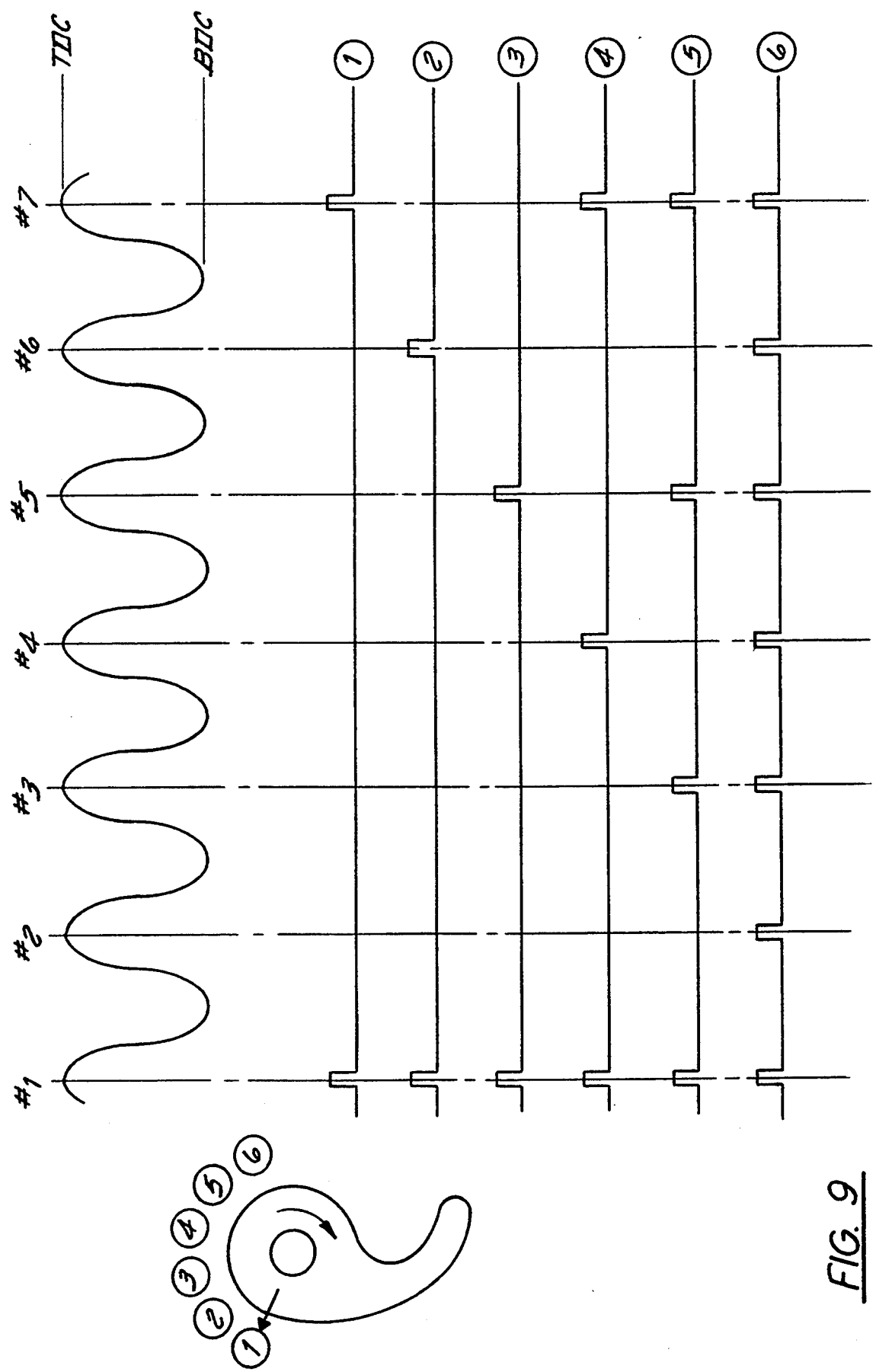
FIG. 9 is a diagrammatic illustration similar to FIG. 8 of another skip-firing method according to the invention which provides six engine power output settings ranging from idle to full power.

Engine load command input conductor 96 also leads to the pulse divider logic circuitry 186, and commands the fuel quantity and therefore the engine load. This control may be either a switch that energizes several digital lines making up conductor 96 corresponding to the desired engine load (digital control), or a potentiometer that generates a single variable voltage corresponding to the desired engine load (analog control). The engine load command applied through conductor 96 may originate with a trigger actuator, which is preferred for many utility engines, or may be twist, lever, slide, or otherwise actuated. The pulse divider logic circuitry includes circuitry that decodes the load command signal furnished through conductor 96. Depending on the load command at any time furnished pulse divider logic circuitry 186 through conductor 96, the pulse divider logic circuitry generates square wave output logic furnished through a conductor 192 to a solid state switch 194. At maximum engine power there will be one output pulse furnished to solid state switch 194 per engine revolution. At reduced engine power, pulse divider logic circuitry 186 will skip-fire and furnish one output pulse to solid state switch 194 every several revolutions. The exact number of revolutions per injection will be a function of commanded load. Two different skip-fire patterns are illustrated in FIGS. 8 and 9 and will be described in detail hereinafter in connection with these figures.

A simple flywheel-mounted generator producing only about 10-15 watts of electrical power is believed by applicants to be sufficient to support initial starting of a small two-cycle utility engine in the first few engine revolutions. Nevertheless, for guaranteed engine starting at low cranking speeds, a supplemental battery may be provided to assure early activation of ECU 90 and corresponding operation of two-way solenoid valve 78.

An alternative to the conventional spark ignition system described above in connection with FIGS. 1 and 6 is a catalytic plasma torch (CPT) system like that shown and described in Cherry U.S. Pat. No. 5,109,817. A CPT ignition system has the advantage of requiring only a simple flywheel-mounted DC generator for the electrical requirements of both ignition and ECU 90. Another advantage of a CPT ignition system is its special tolerance regarding the ignition of lean air/fuel ratios, so it will extend the lean burn limit for a two-cycle skip-fire engine according to the invention which, as described above, tends to have excess combustion air after each skip-fire cycle.

The Ten Function Diagrams of FIGS. 7A and 7B

FIGS. 7A and 7B show ten diagrams or histograms illustrating and coordinating ten engine functions for a representative example two-cycle engine embodying the invention. These ten diagrams illustrate the engine functions for one engine speed, in this case about 6,000 rpm, and for each injection event commencing at bottom dead center (BDC) for crankshaft 26. However, it is to be understood that the injection event may be caused to occur at various crank angles either before or after BDC for purposes described in part above and further to be described below. It is also to be understood that the injection timing relative to crank BDC will vary according to engine speed. Each of the ten diagrams illustrates the history of its respective engine function for one complete crank revolution, starting at the left of the diagram at crank top dead center (TDC), extending to the right through BDC, and then further to the right back to TDC.

The ten diagrams are, in sequence:
(1) piston position (axial location in the cylinder);
(2) exhaust port (open/close timing as determined by piston porting);
(3) scavenge port (air intake port open/closed timing, also piston ported);
(4) cam/pump plunger motion (reciprocating pressurization and pressure release motion of plunger 50 of high pressure pump 46);
(5) two-way vent valve electrical signal (on/off of electrical signal furnished to solenoid-actuated vent valve 78 from ECU 90 for venting the top of the injector needle);
(6) needle control cavity pressure (rise of pressure in control cavity 74 during pump pressurization, and fall of control cavity pressure upon opening of the solenoid valve);
(7) accumulator pressure (rise of accumulator pressure during pump pressurization, and fall of accumulator pressure during injection);
(8) injection rate (rise and fall of fuel injection rate corresponding to accumulator pressure);
(9) spark ignition (correlating ignition timing with droplet transport timing); and
(10) cylinder pressure (cylinder pressure history corresponding to piston power and compression strokes).

Diagram (1), piston position, is a true sine curve extending from maximum at TDC to zero at BDC and back to maximum at TDC. This engine being a piston-ported two-cycle engine, the piston position of diagram (1) relative to the axial location of exhaust port 20 determines the exhaust port opening and closing shown in diagram (2). As seen in diagram (2), the exhaust port is open the same number of degrees before BDC as after BDC. An objective of the fuel system of the invention is to inject at such a time that the plume of injected fuel does not escape out the exhaust port. Applicants have determined that for a typical two-cycle engine embodying the invention, droplet transport time is about 70° of crank angle, as seen in diagram (9), and with injection commencing at BDC, as seen in diagram (8), to prevent escape of injected fuel droplets out the exhaust port, exhaust port timing as shown in diagram (2) is set for closure of the exhaust port at about 70° after BDC. Thus, in diagram (2) the exhaust port is seen to open at about 70° before BDC, and to close at about 70° after BDC.

Comparing scavenge port open timing of diagram (3) with exhaust port open timing of diagram (2), it is seen that in the example engine the scavenge ports open about 15° after the exhaust port opens, and the scavenge ports close about 15° before the exhaust port closes. With this timing, most of the exhaust has escaped through exhaust port 20 before scavenge ports 36 are opened for injection of pressurized fresh air from the crankcase into the cylinder. Thus, by timing the uncovering of scavenge ports 36 by the piston on its downward stroke slightly later than uncovering of exhaust port 20, as shown in diagrams (2) and (3), the high pressure exhaust pulse goes out of the exhaust port before the cylinder is exposed to the injected air from the crankcase. Otherwise the exhaust would seriously interfere with combustion air input to the cylinder.

Referring now to diagram (4), cam/pump plunger motion, normally one skilled in the art would think that if injection is set to commence at BDC, diagram (8), then one would want the peak pump pressure to also occur at BDC because maximum pump pressure would appear to be preferred. However, for two reasons, applicants prefer to time the pump plunger motion so that it reaches its peak substantially after crank BDC, preferably about 30° after BDC. In cooperation with this timing the cam pump pressure relief valve 66 is set to open proximate pump plunger BDC, thus setting the pressure in the hydraulic system at a fixed value slightly below the maximum possible pump pressure. Thus, the pump plunger provides a small amount of extra pressure, and a consistent pressure is provided to both the accumulator section of the injector and the control cavity. One advantage of this is that it allows some manufacturing tolerance on an engine-to-engine basis, while nevertheless allowing for exact timing and corresponding injected fuel mass. The second advantage in thus controlling the peak usable pump pressure to an exact value is that this value remains the same over approximately 60° of crank angle, thus providing a wide "dead band" to work with in the injection timing and injected fuel mass afforded by the various optional forms of the invention (Options A–E previously described in detail).

Referring now to diagram (5), two-way vent valve electrical signal, this signal is a square wave with a sharp leading spike. For injection to commence at crank BDC this leading edge spike of the vent valve electrical signal must occur substantially prior to BDC, as shown in diagram (5), in order to accommodate a vent delay period which is intrinsic in the actuation of the solenoid vent valve. This vent delay period is indicated on diagram (6), and the initial square wave spike is seen in diagram (5) to correspond to the beginning of the vent delay period shown in diagram (6). To ensure initiation of injection at crank BDC, the square wave electrical signal shown in diagram (5) must continue at least until BDC, at which time the control cavity pressure as shown in diagram (6) has dropped from opening of the solenoid valve to a point at which injection will be initiated. Preferably the square wave vent valve electrical signal continues substantially beyond BDC as shown in diagram (5) to keep the solenoid valve open until the needle control cavity is substantially completely vented. Thus, the termination of the square wave electrical signal seen in diagram (5) substantially coordinates with the completion of venting of the control cavity as seen in diagram (6). As seen by comparing diagrams (6) and (7), when the control cavity pressure has, during venting, dropped approximately half-way between peak control cavity pressure and full venting, the needle opening pressure is reached, and injection has been triggered.

An important aspect of the present invention is the fact that the solenoid valve is enabled to be a two-way solenoid valve employed only for venting the control cavity because of the fact that pressurization of the control cavity is timed by high pressure plunger pump 46 which is tied right into the crank rotation, rather than being a three-way valve as required in prior art fuel injection systems which not only controls venting but also must control pressurization from an external pressure source. This ability to employ a two-way valve in the invention enables the solenoid duty cycle (on cycle) to be very short relative to a full crank cycle, only about 30° as seen in diagram (5). This is an important factor in minimizing the amount of electrical energy required to operate the solenoid valve, which is a useful power saving for a small utility engine. Also, in the small utility-type internal combustion engines contemplated as an important use of the invention, the solenoid valve is very tiny, and requires little power for its operation during the very short duty cycle. As an example, if the valve requires 28 volts to open it, and only needs to be opened for about 3/10 of a millisecond to do its job, then the electrical power consumption of the engine, even at high speed such as at 12,000 rpm, is only going to be on the order of about 10–15 watts of power, even including the power consumed energizing the spark plug.

Another feature which applicants employ in their invention to minimize electrical power consumption by the solenoid valve is to employ a control cavity 74 which is as small in volume as possible, and together with that, having solenoid valve vent port 164 as large as possible, these factors enabling further minimization of the duty cycle and hence further reduction of solenoid power requirement.

Another, synergistic, reason for having control cavity 74 as small as possible is because with the very small size of most utility engines, the accumulator cavity needs to be very small for the small quantities of injected fuel required by such tiny engines. With the accumulator cavity volume very small to accommodate this, and the injection event being initiated by venting the control cavity volume above the needle, if that control volume were relatively large in proportion to the volume of the accumulator cavity it could be that a performance problem might arise where the needle starts to lift but does not lift all of the way and maybe even starts to reclose again because pressure in the accumulator cavity has bled off faster than can be accommodated by attempting to vent too large a volume from the control cavity. With regard to minimizing the volume of control cavity 74, although a helical needle spring 142 has been shown in the drawings, it is to be understood that other types of springs requiring less space may be desirable for minimizing the control cavity volume, as for example a beam stress-type spring or a belleville washer-type spring. Summarizing the point, there is an important relationship between the control cavity and accumulator cavity volumes, and to avoid a throttling problem it is important to minimize the control cavity volume relative to the accumulator cavity volume.

Diagrams (6) and (7) clearly indicate the relationship between needle control cavity pressure and accumulator cavity pressure for initiation of an injection event at crank BDC. If injection optionally is to commence either before or after BDC, the relative timing relationship between control cavity pressure and accumulator cavity pressure will be the same as shown in diagrams (6) and (7), but the two curves will simply be offset relative to BDC to the left for initiation of injection before BDC, or to the right for initiation of injection after BDC.

The curves of diagrams (6) and (7) rise similarly before crank BDC because the control cavity and accumulator cavities are pressurized simultaneously from the same source, namely high pressure pump 46. However, while the diagram (6) needle control cavity pressure drops to substantially atmospheric pressure during venting, which is the zero pressure straight line in diagram (6), and therefore also starts at such zero point, the accumulator pressure history both starts and stops at a pressure substantially higher than the zero pressure line as seen in diagram (7), since the accumulator remains pressurized after each injection event in response to the counterbalancing force of the needle closure spring.

Referring now specifically to the curve in diagram (6), the beginning of the vent delay period registers with the leading square wave spike on diagram (5); and the length of the vent delay period is determined by the inertia of the particular solenoid valve employed in the engine, which is precisely predictable. The ending point of the vent delay period is calculated relative to the control cavity pressure decay rate determined by the size of the control cavity and of the solenoid vent port, which are predetermined; and for the present example where the needle valve is to open at crank BDC, the relationship between the sum of the needle spring force and control cavity needle pressure force on the one hand, and the accumulator pressure on the other hand, is such that the needle will open at about the 50 percent decay point on the downslope of the control cavity pressure history. Thus, the accumulator pressure curve continues to rise, but levels off close to horizontal at crank BDC in diagram (7), at which point the accumulator pressure sharply drops and injection begins. The solenoid valve vent port remains open beyond crank BDC as seen in diagram (5) for complete venting of the control cavity so that there will be no interference with accumulator pressure decay and hence with a clean injection event, as previously discussed. The diagram (6) curve shows completion of control cavity venting after crank BDC.

The injection rate graph of diagram (8) shows that injection commences at crank BDC in the example and rises to its peak in only a few degres of crank angle, injecting the primary mass of fuel at a slowly dropping, but still high rate down to about two-thirds of the initial injection rate spike in about 25° or less of crank angle, and then rapidly dropping to zero when the downward needle spring force overcomes the upward accumulator pressure force on the needle.

Diagram (9), entitled "spark ignition," in fact illustrates the timing for both spark ignition and the injected droplet transport timing. Referring first to droplet transport timing, this of course starts, at the left, at the beginning of injection as depicted in diagram (8), which in our example is at crank BDC. Droplet transport time is hereby defined as the period of time it takes the droplets to leave the injector and reach the top of the exhaust port, and the injector spray characteristic is predetermined to have the droplet transport time such that the piston will come up and meet the travelling droplets at about the time the piston closes the exhaust port as seen in diagram (2), thereby preventing escape of fuel out the exhaust port. Droplet transport time is shown in diagram (9) relative to crank angle displacement, which in the present example is about 7° starting at crank BDC and terminating at about 70° after BDC. It will be noted that in diagram (2) the exhaust port is closed at about 70° after crank BDC.

It is to be understood that this droplet transport time of about 70° is only true at one crank speed. The fuel droplet transport time for the selected accumulator injector is about 50 mm per millisecond, and the 70° figure has been calculated in this example at about 6,000 rpm. Droplet transport time will be more than about 70° for lower engine speeds and less than about 70° for higher engine speeds. Thus, for the example injector producing a droplet transport time of about 50 mm per ms, at engine speeds slower than 6,000 rpm some droplets may escape through the exhaust port, and at engine speeds higher than 6,000 rpm the exhaust port will be more than fully closed before the droplets can reach it. If desired, an injector having a slightly slower than 50 mm per ms droplet transport time may be selected to prevent any escape of fuel droplets through the exhaust port at any speed.

Small utility engines normally have a maximum power rpm rating at some predesigned engine speed, such as for example 6,000 rpm or 12,000 rpm, or any particular rpm between these figures. Thus, it is generally preferred to select an accumulator fuel injector that will produce a droplet transport time, as defined hereinabove, at rated engine speed. At slower engine speeds and particularly at idle, which is normally the alternative to the full power engine speed in many small utility two-cycle engines, a minimum amount of fuel droplets is injected, and hence only a minimal amount of fuel droplets is likely to escape through the exhaust port. In this case it will normally be satisfactory to select an accumulator injector which provides a droplet transport time correlated to the full power speed of the engine.

While it has been indicated above that actual droplet transport time may be adjusted for particular rated engine speeds by selection of injectors producing different droplet speeds, all of the timings for the functions of diagrams (5), (6), (7), (8) and the droplet transport timing of diagram (9) may be advanced relative to crank BDC for slower engine speeds than the 6,000 rpm example, and retarded relative to crank BDC for higher engine speeds than the 6,000 rpm example, as an alternative to selection of different injectors to make the compensations. Such timing adjustments may be made by advancing or retarding the vent valve electrical signal illustrated in diagram (5).

High pressure accumulator-type fuel injector 44 of the present invention for the first time enables "charge stratification" to be effectively employed in a small two-cycle utility-type engine so as to provide an overall lean mixture which assures complete combustion with minimal HC and CO exhaust emissions. This can be accomplished by tailoring the accumulator injector spray such that the spray front is substantially short of exhaust port 20 when piston 32 closes the exhaust port during its upward compression stroke. By this means a pocket of excess air is captured below the injected fuel spray to complete the oxidation process during ignition. The fuel spray may be tailored to control the dimension of this pocket of excess air. Thus, a good combustible mixture, preferably stoichiometric, is available for ignition proximate the ignition spark, and the air pocket (or extra lean mixture if some of the leading droplets enter the air pocket) is available to complete the combustion process.

In this case, it is desirable to tailor the spray to spread out relatively rapidly during injection to obtain the desired quantity of fuel injected without the spray front tending to reach exhaust port 20 before it is closed by rising piston 32. A pintle nozzle such as nozzle 116 shown in FIGS. 4 and 5 is useful for enabling such rapid spreading of the injection spray upon injection.

Referring to diagram (9), it is normally desirable to have ignition occur slightly before crank TDC, as for example about 5° before TDC. There is an ignition delay period on the order of about 25° of crank angle from the time the spark plug is energized until the time that ignition occurs, so in this ignition example, the spark plug will be energized at about 30° before crank TDC.

Diagram (10) illustrates a typical cylinder pressure history as the fuel burns. Cylinder pressure is essentially zero at crank BDC, and from that point rises at an increasingly greater rate due solely to the compression stroke of the piston in the cylinder, until ignition occurs slightly before crank TDC, at which point cylinder pressure rapidly rises from combustion to a peak on the order of about 15° after crank TDC, from which point the cylinder pressure gradually falls off as the piston recedes during the power stroke and cylinder volume correspondingly increases, until the cylinder pressure is again essentially zero at crank BDC.

Skip-Fire Power Control Methods of FIGS. 8 and 9

FIGS. 8 and 9 of the drawings ilustrate two presently preferred skip-firing methods for incrementally adjusting engine power between idle and full power output. Referring at first to FIG. 8, the skip-fire method illustrated in this figure utilizes a cascade counting circuit in the pulse divider logic circuitry 186 of ECU 90. In this system there are four engine power output settings ranging from idle to full power, idle having one firing cycle for every eight engine crank revolutions, and full power having eight firing cycles for every crank revolution. Each of the four engine power settings is selected by actuation of a trigger mechanism 200 which is spring biased toward the idle setting.

In FIG. 8 each of the four engine power settings is shown to include nine engine crank cycles, cycles 1–8, and then cycle 9 being a repeat of cycle 1. At the idle setting, shown in diagram (1) of FIG. 8, injection is caused to occur in only the first of eight engine revolutions, and skip-firing is caused to occur at engine crank revolutions 2–8 by operation of solenoid valve 78 as described hereinabove in connection with each of the Options A–D forms of the invention. For a ¼ engine power setting depicted in diagram (2) of FIG. 8 injection, and hence engine firing, is caused to occur during engine crank cycles 1 and 5, with skip-firing by noninjection during crank cycles 2, 3, 4, 6, 7 and 8. Diagram (3) of FIG. 8 illustrates a ½ engine power setting in which injection, and hence firing, is caused to occur during crank cycles 1, 3, 5 and 7, with skip-firing during crank cycles 2, 4, 6 and 8. Full power is illustrated in diagram (4) of FIG. 8 with injection, and hence firing, being caused to occur during each of the engine cycles, without any skip-firing cycles. The method illustrated in FIG. 8 is applicable to simple engine uses with a broad tolerance on acceptable idle speed and minimal part load control requirements.

The skip-firing method illustrated in FIG. 9 is applicable where more precise part-load performance is required, and six load selection diagrams are illustrated in FIG. 9. In the method illustrated in FIG. 9 firing and skip-firing cycles are designated for six settings of trigger actuator 200, illustrated in respective diagrams (1)–(6). The idle power setting illustrated in diagram (1) of FIG. 9 involves injection and firing in only one of every six consecutive crank cycles, and then skip-firing during the next five consecutive crank cycles. Power setting 2 involves injection and firing in one of every five consecutive crank cycles, and then skip-firing during the next four consecutive crank cycles. Power setting 3 causes injection and firing to occur in one of every four consecutive crank cycles, and then skip-firing to occur during the next three consecutive crank cycles. Power setting 4 causes injection and firing in one of every three consecutive crank cycles, and skip-firing during the next two consecutive crank cycles. Power setting 5 causes injection and firing every other consecutive crank cycle, with skip-firing during the intermediate crank cycles. Full power setting 6 involves injection and firing each crank cycle.

It is to be understood that the skip-firing power selection methods illustrated in FIGS. 8 and 9 are presently preferred methods, and that other skip-firing methods may be employed within the scope of the invention, the skip-firing methods illustrated in FIGS. 8 and 9 being given by way of example only, and not of limitation. The skip-fire power control method illustrated in FIG. 8 is determined by cascade control circuit means of the pulse divider logic circuitry 186 diagrammatically illustrated in FIGS. 1 and 6, while the skip-fire power control method illustrated in FIG. 9 is determined by incremental control circuit means of the pulse divider logic circuitry 186 of FIGS. 1 and 6.

Skip-Fire Effect on Scavenge Efficiency

Due to the basic operating principle of the conventional two-cycle engine, the scavenge efficiency, or percent of trapped cylinder volume actually occupied by fresh air charge, is on the order of about 75–80 percent. The remaining trapped cylinder volume is occupied by products of combustion from a previous engine cycle. When skip-fire control strategy is employed whereby injection fuel is withheld during intermittent engine cycles, fresh air only is pumped through the engine cylinder during these noninjection cycles. As a result the effective scavenge efficiency for the firing or injection cycle immediately following a nonfiring cycle approaches 100 percent. In order to prepare a homogenous stoichiometric fuel/air charge for normal combustion during skip-firing, it is desirable to either increase fuel delivery to compensate for the additional fresh air supply, or artifically reduce the incoming air charge by throttling or other means. As an alternative, if the injected fuel spray is properly developed to form a stratified fuel charge capable of efficient combustion in the presence of excess air, then compensation for the excess air due to high scavenge efficiency during skip-fire operation will not be required. A useful feature for properly developing such a stratified fuel charge is employment of a pintle nozzle like nozzle 116 seen in FIGS. 4 and 5.

While the present invention has been described with regard to particular embodiments, it is to be understood that modifications may readily be made by those skilled in the art, and it is intended that the claims cover any such modifications which fall within the scope and spirit of the invention as set forth in the appended claims.

What is claimed is:

1. In a two-cycle internal combustion engine, the method of introducing fuel into a cylinder of the engine, which comprises:
   providing an accumulator-type fuel injector in said two-cycle engine arranged for direct in-cylinder injection, said injector having a needle normally spring-biased downwardly to a closed position, an accumulator cavity located so as to provide an upward opening force on said needle when pressurized, and a control cavity above said needle located so as to provide a downward closing force on said needle when pressurized;

substantially simultaneously pressurizing said accumulator and control cavities with fuel through respective accumulator and control cavity feed conduits to about the same pressure level above that which would be sufficient for the upward force of accumulator pressure on said needle to overcome said spring biasing but for the downward force of control cavity pressure on said needle;

at least partially depressurizing said accumulator cavity feed conduit for a substantial portion of the combustion cycle while preventing unrestricted return fuel flow through said accumulator cavity feed conduit from said accumulator cavity; and venting fuel pressure from said control cavity via operation of a two-way solenoid-actuated vent valve in communication with said control cavity so that said upward force of accumulator pressure on said needle overcomes said downward forces on said needle and raises said needle to an open position for injection of fuel from said accumulator injector directly into the cylinder.

2. The method of claim 1, wherein a fuel/air mixture in said cylinder is spark-ignited.

3. The method of claim 2, which comprises fabricating the head and cylinder of said engine as an integral casting; and placing said accumulator-type fuel injector, said two-way solenoid-actuated vent valve, and spark ignition means directly in the head.

4. The method of claim 2, which comprises hydromechanically producing said pressurizing.

5. In a two-cycle internal combustion engine, the method of introducing fuel into a cylinder of the engine, which comprises:

providing an accumulator-type fuel injector in said two-cycle engine arranged for direct in-cylinder injection, said injector having a needle normally spring-biased downwardly to a closed position, an accumulator cavity located so as to provide an upward opening force on said needle when pressurized, and a control cavity above said needle located so as to provide a downward closing force on said needle when pressurized;

substantially simultaneously pressurizing said accumulator and control cavities with fuel through respective accumulator and control cavity feed conduits to about the same pressure level above that which would be sufficient for the upward force of accumulator pressure on said needle to overcome said spring biasing but for the downward force of control cavity pressure on said needle;

at least partially depressurizing said accumulator cavity feed conduit for a substantial portion of the combustion cycle while preventing unrestricted return fuel flow through said accumulator cavity feed conduit from said accumulator cavity; and venting fuel pressure from said control cavity via operation of a two-way solenoid-actuated vent valve in communication with said control cavity so that said upward force of accumulator pressure on said needle overcomes said downward forces on said needle and raises said needle to an open position for injection of fuel from said accumulator injector directly into the cylinder; wherein said pressurizing and depressurizing steps comprise mechanically reciprocating a high pressure fuel pump plunger in a first direction to produce said pressurizing and in a second direction to produce said depressurizing.

6. The method of claim 5, which comprises reciprocating said plunger by a cam lobe mechanically driven directly by the engine crankshaft.

7. The method of claim 6, wherein said cam lobe is located directly on the crankshaft.

8. The method of claim 5, which comprises reciprocating said plunger so that the pump pressure output produced by the motion of said plunger rises from a predetermined low pressure to a predetermined peak pressure.

9. The method of claim 9, wherein the motion of said plunger, when plotted against time, generally follows a sine curve.

10. The method of claim 8, which comprises pressure-relieving said pump pressure output at a maximum pressure slightly below said peak pressure so as to assure a uniform said maximum pressure in said pressurizing of said accumulator cavity and said control cavity despite manufacturing tolerances.

11. The method of claim 8, which comprises placing a check valve in said accumulator cavity feed conduit, so that the highest pump output pressure received will be retained in said accumulator cavity until venting of said control cavity by said solenoid vent valve, if said venting is timed to occur proximate or after pressure in said accumulator cavity has risen to said highest pressure.

12. The method of claim 12, which comprises placing a flow-restricting orifice in said control cavity feed conduit so that fuel inflow through said control cavity feed conduit during control cavity venting does not interfere with solenoid vent valve venting of said control cavity.

13. The method of claim 12, wherein said orifice is a variable orifice.

14. The method of claim 11, wherein said solenoid valve is timed to vent said control cavity proximate or after the time that pressure in said accumulator cavity has risen to said highest pressure, providing a maximum injected fuel mass.

15. The method of claim 12, wherein said solenoid vent valve is timed to vent said control cavity before pressure in said accumulator cavity has risen to said highest pressure, providing a reduced injected fuel mass.

16. The method of claim 8, which comprises placing a check valve in said control cavity feed conduit so that the highest pump output pressure received will be retained in said control cavity until venting of said control cavity by said solenoid vent valve.

17. The method of claim 16, which comprises placing a flow-restricting orifice in said accumulator cavity feed conduit so as to minimize fuel backflow from said accumulator cavity during injection events, and so that the "effective" accumulator cavity volume during injection remains generally the same as the actual volume of said accumulator cavity.

18. The method of claim 16, wherein said solenoid vent valve is timed to vent said control cavity proximate the time that pressure in said accumulator cavity has risen to the highest pump output pressure received, providing a maximum injected fuel mass.

19. The method of claim 16, wherein said solenoid vent valve is timed to vent said control cavity either before or after pressure in said accumulator cavity has risen to the highest pump output pressure receivable by said accumulator cavity, providing a reduced injected fuel mass.

20. The method of claim 8, which comprises placing a flow-restricting orifice in each of said accumulator cavity and control cavity feed conduits, so as to minimize fuel inflow through said control cavity feed conduit during control cavity venting and so as to minimize fuel backflow through the accumulator cavity feed conduit, whereby fuel inflow through said control cavity feed conduit does not interfere with solenoid vent valve venting of said control cavity, and the "effective" accumulator cavity volume during injection remains generally the same as the actual volume of said accumulator cavity.

21. The method of claim 20, wherein said solenoid vent valve is timed to vent said control cavity proximate the time that pressure in said accumulator cavity has risen to the highest pump output pressure received, providing a maximum injected fuel mass.

22. The method of claim 20, wherein said solenoid vent valve is timed to vent said control cavity either before or after pressure in said accumulator cavity has risen to the highest pump output pressure receivable by said accumulator cavity, providing a reduced injected fuel mass.

23. The method of claim 9, which comprises placing a check valve in each of said accumulator cavity and control cavity feed conduits, so that the highest pump output pressure received will be retained in both of said accumulator cavity and said control cavity until venting of said control cavity by said solenoid vent valve, if said venting is timed to occur proximate or after pressure in said accumulator cavity has risen to said highest pressure.

24. The method of claim 23, wherein said solenoid vent valve is timed to vent said control cavity proximate or after the time that pressure in said accumulator cavity has risen to said highest pressure, providing a maximum injected fuel mass.

25. The method of claim 23, wherein said solenoid vent valve is timed to vent said control cavity before pressure in said accumulator cavity has risen to said highest pressure, providing a reduced injected fuel mass.

26. In a two-cycle internal combustion engine, the method of introducing fuel into a cylinder of the engine, which comprises:

providing an accumulator-type fuel injector in said two-cycle engine arranged for direct in-cylinder injection, said injector having a needle normally spring-biased downwardly to a closed position, an accumulator cavity located so as to provide an upward opening force on said needle when pressurized, and a control cavity above said needle located so as to provide a downward closing force on said needle when pressurized;

substantially simultaneously pressurizing said accumulator and control cavities with fuel through respective accumulator and control cavity feed conduits to about the same pressure level above that which would be sufficient for the upward force of accumulator pressure on said needle to overcome said spring biasing but for the downward force of control cavity pressure on said needle;

at least partially depressurizing said accumulator cavity feed conduit for a substantial portion of the combustion cycle while preventing unrestricted return fuel flow through said accumulator cavity feed conduit from said accumulator cavity; and venting fuel pressure from said control cavity via operation of a two-way solenoid-actuated vent valve in communication with said control cavity so that said upward force of accumulator pressure on said needle overcomes said downward forces on said needle and raises said needle to an open position for injection of fuel from said accumulator injector directly into the cylinder; wherein said pressurizing and depressurizing steps are performed by a reciprocating plunger high pressure pump, wherein the pump pressure output produced by the motion of said plunger rises from a predetermined low pressure to a predetermined peak pressure and then falls back to said predetermined low pressure, wherein said step of preventing unrestricted return fuel flow comprises providing a flow-restriction device in said accumulator cavity feed conduit to limit fuel backflow toward said pump so as to maintain accumulator pressure substantially higher than control cavity pressure prior to injection, injection being initiated by venting of said control cavity by backflow of fuel from said control cavity toward the pump as pressure thus falls back from said peak pressure toward said low pressure.

27. The method of claim 26, wherein said flow-restriction device comprises a check valve, providing a maximum injected fuel mass.

28. The method of claim 2, which comprises varying the power output of said engine by skip-firing, said skip-firing being accomplished by causing noninjection of fuel in the engine cylinder during one or more engine crankshaft cycles during a series of a predetermined number of crankshaft cycles.

29. The method of claim 28, which comprises causing said noninjection by one of (a) not venting said control cavity and (b) venting said control cavity early in the combustion cycle to prevent fuel pressurization of the accumulator and control cavities.

30. The method of claim 28, wherein the engine power is varied from idle to full power.

31. The method of claim 28, which comprises causing said skip-firing by utilizing a cascade counting circuit in pulse divider logic circuitry of an engine ECU.

32. The method of claim 28, which comprises providing four engine power settings ranging from idle to full power.

33. The method of claim 28, which comprises providing six engine power settings ranging from idle to full power.

34. The method of claim 8, wherein said engine is piston-ported, and which comprises timing said solenoid vent valve to cause initiation of injection generally proximate engine BDC when the piston is generally proximate its lowest position in the cylinder, and tailoring the injection spray such that the piston has risen after BDC to a position where it substantially closes the engine exhaust port by the time the injection spray front reaches the exhaust port, so as to substantially prevent escape of unburned fuel droplets out through the exhaust port.

35. The method of claim 34, which comprises timing said solenoid vent valve to cause initiation of injection to vent said control cavity proximate the time that pressure in said accumulator cavity has risen to the highest pump output pressure received, providing a maximum injected fuel mass.

36. The method of claim 34, which comprises timing said solenoid vent valve to vent said control cavity either before or after pressure in said accumulator cavity has risen to the highest pump output pressure receivable by said accumulator cavity, providing a reduced injected fuel mass.

37. The method of claim 8, wherein said engine is piston-ported, and which comprises timing said solenoid vent valve to cause initiation of injection generally proximate engine BDC when the piston is generally proximate its lowest position in the cylinder, and tailoring the injection spray such that when the piston has risen after BDC to a position where it substantially closes the engine exhaust port, the injection spray front is still spaced substantially above the piston, whereby a pocket of intake air will be captured within the cylinder between the spray front and the piston so as to provide stratified charge combustion.

38. The method of claim 2, which comprises providing a magneto located proximate the engine flywheel and electrically energized by a permanent magnet peripherally located on the flywheel, and an electrically energizing spark igniter in the engine head energized by high voltage output from said magneto.

39. The method of claim 38, which comprises periodically actuating said solenoid vent valve to periodically vent said control cavity to initiate a series of injections by a periodic electrical pulse output from an ECU, and electrically energizing said ECU by an electrical output from a charging coil associated with said magneto.

40. The method of claim 39, wherein said charging coil comprises the primary winding of said magneto.

41. The method of claim 39, wherein said charging coil comprises a separate charging coil.

42. The method of claim 39, which comprises timing said ECU by an electrical pulse output from an engine position and speed sensor located proximate the engine flywheel and electrically energized by said permanent magnet.

43. The method of claim 39, which comprises varying engine power by skip-firing accomplished by causing the ECU to periodically one of (a) not actuate said solenoid vent valve and (b) vent said control cavity early in the combustion cycle to prevent fuel pressurization of the accumulator and control cavities, and commanding the ECU to cause such skip-firing by an engine load command device having an electrical output connected to the ECU.

44. The method of claim 43, wherein said electrical output is digital.

45. The method of claim 43, wherein said electrical output is analog.

46. The method of claim 10, wherein said pressure relieving of said pump pressure output is accomplished by a variable pressure relief valve comprising a spring-biased closure device, and varying the spring-biasing force on said closure device so as to vary said pump output maximum pressure.

47. The method of claim 46, wherein said varying of the spring-biasing force is accomplished by a trigger actuator.

48. The method of claim 8, which comprises boosting the pump fuel input by a fuel transfer pump in the pump fuel input.

49. The method of claim 48, which comprises varying the fuel pressure output of said transfer pump so as to vary the high pressure pump output pressure.

50. The method of claim 49, wherein said varying of the fuel pressure output of said transfer device is commanded by an ECU.

51. A two-cycle internal combustion engine, which comprises:
an accumulator-type fuel injector mounted in the two-cycle engine and arranged for direct in-cylinder injection, said injector having a needle normally spring-biased downwardly to a closed position, an accumulator cavity located so as to provide an upward opening force on said needle when pressurized, and a control cavity above said needle located so as to provide a downward closing force on said needle when pressurized;
a source of fuel;
a high pressure fuel pump having an input operatively connected to said fuel source and having an output in fluid communication with said accumulator and control cavities through respective accumulator and control cavity feed conduits so as to substantially simultaneously and periodically provide pressurized fuel at about the same pressure level to said accumulator and control cavities and to periodically at least partially depressurize at least a portion of said accumulator cavity feed conduit for a substantial portion of the combustion cycle, said pressure level being sufficient for the upward force of accumulator pressure on said needle to overcome said spring-biasing but for the downward force of control cavity pressure on said needle, said accumulator cavity. feed conduit having a device located therein to prevent unrestricted return fuel flow therethrough when said accumulator cavity feed conduit is depressurized; and
a two-way solenoid-actuated vent valve, in fluid communication with said control cavity, for periodically venting fuel pressure from said control cavity, whereby upon such venting said upward force of accumulator pressure on said needle overcomes said downward forces on said needle and raises said needle to an open position for injection of fuel from said accumulator injector directly into the cylinder.

52. The apparatus of claim 51, which comprises spark ignition means in said engine head for igniting a fuel/air mixture in said engine cylinder.

53. The apparatus of claim 52, wherein the head and cylinder of said engine comprise an integral casting; said accumulator-type fuel injector, said two-way solenoid-actuated valve, and said spark ignition means all being located in said head.

54. The apparatus of claim 52, wherein said pump is mechanically driven by the engine crankshaft.

55. The apparatus of claim 54, wherein said pump comprises a mechanically actuated reciprocating plunger pump.

56. The apparatus of claim 55, which further comprises a cam lobe operatively engaged against one end of said plunger for reciprocating said plunger, the other end of said plunger operating to pressurize fuel when it rises under the influence of said cam lobe.

57. The apparatus of claim 56, wherein said cam lobe is located directly on the crankshaft.

58. The apparatus of claim 56, wherein said cam lobe reciprocates said plunger so that the pump pressure output produced by the motion of said plunger rises from a predetermined low pressure to a predetermined peak pressure.

59. The apparatus of claim 58, wherein the motion of said plunger when plotted against time, generally follows a sine curve.

60. The apparatus of claim 58, which comprises a pressure relief valve in fluid communication with said pump output and set to pressure-relieve the pump output at a maximum pressure slightly below said peak pressure so as to assure a uniform said maximum pressure in said pressurizing of said accumulator cavity and said control cavity despite manufacturing tolerances.

61. The apparatus of claim 58, wherein said device in said accumulator cavity feed conduit comprises a check valve, whereby the highest pump output pressure received will be retained in said accumulator cavity until venting of said control cavity by said solenoid vent valve, if said venting is timed to occur proximate or after pressure in said accumulator cavity has risen to said highest pressure.

62. The apparatus of claim 61, which comprises a flow-restricting orifice in said control cavity feed conduit, whereby fuel inflow through said control cavity feed conduit during control cavity venting does not interfere with solenoid valve venting of said control cavity.

63. The apparatus of claim 61, wherein said orifice is a variable orifice.

64. The apparatus of claim 61, wherein said solenoid vent valve is timed to vent said control cavity proximate or after the time that pressure in said accumulator cavity has risen to said highest pressure, providing a maximum injected fuel mass.

65. The apparatus of claim 61, wherein said solenoid vent valve is timed to vent said control cavity before pressure in said accumulator cavity has risen to said highest pressure, providing a reduced injected fuel mass.

66. The apparatus of claim 58, which comprises a check valve in said control cavity feed conduit, whereby the highest pump output pressure received will be retained in said control cavity until venting of said control cavity by said solenoid vent valve.

67. The apparatus of claim 66, wherein said device in said accumulator cavity feed conduit comprises a flow-restricting orifice, whereby fuel backflow from said accumulator cavity is minimized during injection events, and the "effective" accumulator cavity volume during injection remains generally the same as the actual volume of said accumulator cavity.

68. The apparatus of claim 66, wherein said solenoid vent valve is timed to vent said control cavity proximate the time that pressure in said accumulator cavity has risen to the highest pump output pressure received, providing a maximum injected fuel mass.

69. The apparatus of claim 66, wherein said solenoid vent valve is timed to vent said control cavity either before or after pressure in said accumulator cavity has risen to the highest pump output pressure receivable by said accumulator cavity, providing a reduced injected fuel mass.

70. The apparatus of claim 58, wherein said device in said accumulator cavity feed conduit comprises a flow restricting orifice, and further comprising a flow-restricting orifice in the control cavity feed conduit, thereby minimizing fuel inflow through said control cavity feed conduit during control cavity venting and so as to minimize fuel backflow through the accumulator cavity feed conduit, whereby fuel inflow through said control cavity feed conduit does not interfere with solenoid vent valve venting of said control cavity, and the "effective" accumulator cavity volume during injection remains generally the same as the actual volume of said accumulator cavity.

71. The apparatus of claim 70, wherein said solenoid vent valve is timed to vent said control cavity proximate the time that pressure in said accumulator cavity has risen to the highest pump output pressure received, providing a maximum injected fuel mass.

72. The apparatus of claim 73, wherein said solenoid vent valve is timed to vent said control cavity either before or after pressure in said accumulator cavity has risen to the highest pump output pressure receivable by said accumulator cavity, providing a reduced injected fuel mass.

73. The apparatus of claim 58, wherein said device in said accumulator cavity feed conduit comprises a check valve, and further comprising a check valve in said control cavity feed conduit, whereby the highest pump output pressure received will be retained in both of said accumulator cavity and said control cavity until venting of said control cavity by said solenoid vent valve, if said venting is timed to occur proximate or after pressure in said accumulator cavity has risen to said highest pressure.

74. The apparatus of claim 73, wherein said solenoid vent valve is timed to vent said control cavity proximate or after the time that pressure in said accumulator cavity has risen to said highest pressure, providing a maximum injected fuel mass.

75. The apparatus of claim 73, wherein said solenoid vent valve is timed to vent said control cavity before pressure in said accumulator cavity has risen to said highest pressure, providing a reduced fuel mass.

76. A two-cycle internal combustion engine, which comprises:

an accumulator-type fuel injector mounted in the two-cycle engine and arranged for direct in-cylinder injection, said injector having a needle normally spring-biased downwardly to a closed position, an accumulator cavity located so as to provide an upward opening force on said needle when pressurized, and a control cavity above said needle located so as to provide a downward closing force on said needle when pressurized;

a source of fuel;

a high pressure fuel pump having an input operatively connected to said fuel source and having an output in fluid communication with said accumulator and control cavities through respective accumulator and control cavity feed conduits so as to substantially simultaneously and periodically provide pressurized fuel at about the same pressure level to said accumulator and control cavities and to periodically at least partially depressurize at least a portion of said accumulator cavity feed conduit for a substantial portion of the combustion cycle, said pressure level being sufficient for the upward force of accumulator pressure on said needle to overcome said spring-biasing but for the downward force of control cavity pressure on said needle, said accumulator cavity feed conduit having a device located therein to prevent unrestricted return fuel flow therethrough when said accumulator feed conduit is depressurized, wherein said pump comprises a reciprocating plunger high pressure pump, wherein the pump pressure output produced by the motion of said plunger rises from a predetermined low pressure to a predetermined peak pressure and then falls back to said predetermined low pressure, injection being initiated by venting of said control cavity by venting of fuel from said control cavity toward the pump as pressure thus falls back from said peak pressure toward said low pressure, whereby upon such venting said upward force of accumulator pressure on said needle overcomes said downward forces on said needle and raises said needle to an open position for injection of fuel from said accumulator injector directly into the cylinder.

77. The apparatus of claim 76, wherein said flow restriction comprises a check valve, providing a maximum injected fuel mass.

78. The apparatus of claim 52, which comprises ECU means, electrically connected to said solenoid vent valve, for periodically energizing said solenoid vent valve to cause venting of said control cavity and consequent initiation of injection; and engine load command input means, electrically connected to said ECU means, for causing said ECU means to one of (a) nonenergize said solenoid vent valve and (b) vent said control cavity early in the combustion cycle so as to prevent fuel pressurization of the accumulator and control cavities and thereby to cause skip-firing by noninjection of fuel in the engine cylinder during one or more engine crankshaft cycles during a series of predetermined number of crankshaft cycles, thereby reducing the engine power output from full power.

79. The apparatus of claim 78, wherein said load command input causes said ECU means to vary engine power from idle to full power.

80. The apparatus of claim 79, wherein said ECU means comprises a cascade counting circuit.

81. The apparatus of claim 78, wherein said load command input causes said ECU means to provide four engine power settings ranging from idle to full power.

82. The apparatus of claim 78, wherein said load command input causes said ECU means to provide six engine power settings ranging from idle to full power.

83. The apparatus of claim 58, wherein said engine is piston-ported, and which comprises ECU, electrically connected to said solenoid vent valve means, for causing venting of said control cavity and consequent initiation of injection;

said ECU means timing said solenoid vent valve to cause initiation of injection generally proximate engine BDC when the piston is generally proximate its lowest position in the cylinder, and tailoring the injection spray such that the piston has risen after BDC to a position where it substantially closes the engine exhaust port by the time the injection spray front reaches the exhaust port, so as to substantially prevent escape of unburned fuel droplets out through the exhaust port.

84. The apparatus of claim 83, wherein said ECU means times said solenoid vent valve to cause initiation of injection to vent said control cavity proximate the time that pressure in said accumulator cavity has risen to the highest pump output pressure received, providing a maximum injected fuel mass.

85. The apparatus of claim 83, wherein said ECU means times said solenoid vent valve to vent said control cavity either before or after pressure in said accumulator cavity has risen to the highest pump output pressure receivable by said accumulator cavity, providing a reduced injected fuel mass.

86. The apparatus of claim 58, wherein said engine is piston-ported, and which comprises ECU means, electrically connected to said solenoid vent valve, for timing energization of said solenoid vent valve to periodically vent said control cavity to initiate injection, said ECU timing energization of said solenoid vent valve to cause initiation of injection generally proximate engine BDC when the piston is generally proximate its lowest position in the cylinder;

said accumulator fuel injector being configured to tailor the injection spray such that when the piston has risen after BDC to a position where it substantially closes the engine exhaust port, the injection spray front is still spaced substantially above the piston, whereby a pocket of intake air will be captured within the cylinder between the spray front and the piston so as to provide stratified charge combustion.

87. The apparatus of claim 52, which comprises a permanent magnet peripherally located on the flywheel, a magneto located proximate the engine flywheel and electrically energized by said permanent magnet, and an electrically energized spark ignition device in the engine head energized by high voltage output from said magneto.

88. The apparatus of claim 87, which comprises ECU means, electrically connected to said solenoid vent valve, for periodically energizing said solenoid vent valve to cause venting of said control cavity and consequent initiation of injection; and changing coil means, associated with said magneto and electrically connected to said ECU means, for electrically energizing said ECU.

89. The apparatus of claim 88, wherein said charging coil comprises the primary winding of said magneto.

90. The apparatus of claim 88, wherein said charging coil means comprises a separate charging coil.

91. The apparatus of claim 88, which comprises an engine position and speed sensor located proximate the engine flywheel and electrically energized by said permanent magnet, said position and speed sensor having an electrical pulse output connected to said ECU means for timing said ECU means.

92. The apparatus of claim 88, which comprises engine load command input electrically connected to said ECU means, for causing said ECU means to one of (a) nonenergize said solenoid vent valve and (b) vent said control cavity early in the combustion cycle to prevent fuel pressurization of the accumulator and control cavities so as to cause skip-firing by noninjection of fuel in the engine cylinder during one or more engine crankshaft cycles during a series of a predetermined number of crankshaft cycles, thereby reducing the engine power output from full power.

93. The apparatus of claim 92, wherein said load command input provides a digital command to said ECU means.

94. The apparatus of claim 92, wherein said load command input provides an analog command to said ECU means.

95. The apparatus of claim 60, wherein said pressure relief valve comprises a spring-biased closure device, and means, operatively associated with said biasing spring, for varying the spring force applied to said closure device so as to vary said pump output maximum pressure.

96. The apparatus of claim 95, wherein said spring force varying device comprises a trigger actuator.

97. The apparatus of claim 58, which comprises a fuel transfer pump means, operatively associated with said high pressure pump input, for boosting the pressure of fuel supplied to said input.

98. The apparatus of claim 97, wherein said transfer pump means has a variable pressure output so as to vary the high pressure pump output pressure.

99. The apparatus of claim 98, which comprises ECU means, electrically connected to said fuel transfer pump means, for commanding variation of the output pressure of said fuel transfer pump means.

100. A method of introducing fuel into a cylinder of a two-cycle engine, which comprises:
(A) providing
  (1) a high pressure fuel pump plunger, and
  (2) an accumulator-type fuel injector in said two-cycle engine arranged for direct in-cylinder injection, said injector having
    (a) a needle normally spring-biased downwardly to a closed position,
    (b) an accumulator cavity (i) located so as to provide an upward opening force on said needle when pressurized and (ii) communicating with said pump via an accumulator cavity feed conduit in which is disposed a check valve permitting fuel flow into said accumulator cavity from said pump but preventing reverse flow therethrough, and
    (c) a control cavity (i) located above said needle so as to provide a downward closing force on said needle when pressurized, and (ii) communicating with said pump via a control cavity feed conduit in which is disposed a flow-restricting orifice;
(B) reciprocating the pump plunger, thereby cyclically varying the pump output pressure from a predetermined low pressure to a peak pressure, thereby periodically (1) substantially simultaneously pressurizing said accumulator and control cavities to about the same pressure level above that which would be sufficient for the upward force of accumulator pressure on said needle to overcome said spring biasing but for the downward force of control cavity pressure on said needle, and then (2) partially depressurizing said accumulator cavity feed conduit while maintaining said peak pressure in said accumulator due to operation of said check valve; and
(C) venting fuel pressure from said control cavity via operation of a two-way solenoid-actuated vent valve so that said upward force of accumulator pressure on said needle overcomes said downward forces on said needle and raises said needle to an open position for injection of fuel from said accumulator injector directly into the cylinder, wherein, due to the presence of said flow-restricting orifice, fuel inflow through said control cavity feed conduit does not interfere with solenoid vent valve venting of said control cavity.

101. A method of introducing fuel into a cylinder of a two-cycle engine, which comprises:
(A) providing
  (1) a high pressure fuel pump plunger, and
  (2) an accumulator-type fuel injector in said two-cycle engine arranged for direct in-cylinder injection, said injector having
    (a) a needle normally spring-biased downwardly to a closed position,
    (b) an accumulator cavity (i) located so as to provide an upward opening force on said needle when pressurized and (ii) communicating with said pump via an accumulator cavity feed conduit, and
    (c) a control cavity located above said needle so as to provide a downward closing force on said needle when pressurized;
(B) reciprocating the pump plunger, thereby cyclically varying the pump output pressure from a predetermined low pressure to a peak pressure, thereby periodically (1) substantially simultaneously pressurizing said accumulator and control cavities to about the same pressure level above that which would be sufficient for the upward force of accumulator pressure on said needle to overcome said spring biasing but for the downward force of control cavity pressure on said needle, and then (2) partially depressurizing said accumulator cavity feed conduit;
(C) pressure relieving said pump pressure output at a maximum pressure slightly below said peak pressure so as to assure a uniform pressurization of said accumulator cavity and said control cavity despite manufacturing tolerances, wherein said pressure relieving of said pump pressure output is accomplished by a pressure relief valve comprising a spring biased closure device and by varying the spring biasing force on said closure device so as to vary pump output maximum pressure; and
(D) venting fuel pressure from said control cavity via operation of a two-way solenoid-actuated vent valve so that said upward force of accumulator pressure on said needle overcomes said downward forces on said needle and raises said needle to an open position for injection of fuel from said accumulator injector directly into the cylinder.

102. A method of introducing fuel into a cylinder of a two-cycle engine, which comprises:
(A) providing
  (1) a high pressure fuel pump plunger, and
  (2) an accumulator-type fuel injector in said two-cycle engine arranged for direct in-cylinder injection, said injector having
    (a) a needle normally spring-biased downwardly to a closed position,
    (b) an accumulator cavity (i) located so as to provide an upward opening force on said needle when pressurized and (ii) communicating with said pump via an accumulator cavity feed conduit, and
    (c) a control cavity located above said needle so as to provide a downward closing force on said needle when pressurized;
(B) reciprocating the pump plunger, thereby cyclically varying the pump output pressure from a predetermined low pressure to a peak pressure, thereby periodically (1) substantially simultaneously pressurizing said accumulator and control cavities to about the same pressure level above that which would be sufficient for the upward force of accumulator pressure on said needle to overcome said spring biasing but for the downward force of control cavity pressure on said needle, and then (2) partially depressurizing said accumulator cavity feed conduit;

(C) boosting the pump fuel inlet pressure via operation of a transfer pump located in a pump fuel inlet conduit;

(D) varying the fuel pressure output of said transfer pump so as to vary the high pressure pump output pressure; and (E) venting fuel pressure from said control cavity via operation of a two-way solenoid-actuated vent valve so that said upward force of accumulator pressure on said needle overcomes said downward forces on said needle and raises said needle to an open position for injection of fuel from said accumulator injector directly into the cylinder.

103. A two-cycle internal combustion engine which comprises:
(A) an accumulator-type fuel injector mounted in said two-cycle engine and arranged for direct in-cylinder injection, said injector having
  (1) a needle normally spring-biased downwardly to a closed position,
  (2) an accumulator cavity (a) located so as to provide an upward opening force on said needle when pressurized and (b) receiving pressurized fuel via an accumulator cavity feed conduit,
  (3) a check valve disposed in said accumulator cavity feed conduit and permitting fuel flow into said accumulator cavity from said pump but preventing reverse flow therethrough,
  (3) a control cavity (a) located above said needle so as to provide a downward closing force on said needle when pressurized, and (b) receiving pressurized fuel via a control cavity feed conduit, and
  (4) a flow-restricting orifice provided in said control cavity feed conduit;
(B) a source of fuel;
(C) a high pressure fuel pump having an input operatively connected to said fuel source and having an output in fluid communication with said accumulator and control cavities through the accumulator and control cavity feed conduits so as to substantially simultaneously and periodically provide pressurized fuel at about the same pressure level to said accumulator and control cavities and to periodically at least partially depressurize at least a portion of said accumulator feed conduit for a substantial portion of the combustion cycle, said pressure level being sufficient for the upward force of accumulator pressure on said needle to overcome said spring-biasing but for the downward force of control cavity pressure on said needle; and
(D) a two-way solenoid-actuated vent valve, in fluid communication with said control cavity, for periodically venting fuel pressure from said control cavity, whereby upon such venting said upward force of accumulator pressure on said needle overcomes said downward forces on said needle and raises said needle to an open position for injection of fuel from said accumulator injector directly into the cylinder, and whereby, due to the presence of said flow-restricting orifice, fuel inflow through said control cavity feed conduit does not interfere with solenoid vent valve venting of said control cavity.

104. A two-cycle internal combustion engine which comprises:
(A) an accumulator-type fuel injector mounted in said two-cycle engine and arranged for direct in-cylinder injection, said injector having
  (1) a needle normally spring-biased downwardly to a closed position,
  (2) an accumulator cavity (a) located so as to provide an upward opening force on said needle when pressurized and (b) receiving pressurized fuel via an accumulator cavity feed conduit, and
  (3) a control cavity (a) located above said needle so as to provide a downward closing force on said needle when pressurized, and (b) receiving pressurized fuel via a control cavity feed conduit;
(B) a source of fuel;
(C) a reciprocating plunger type high pressure fuel pump having an input operatively connected to said fuel source and having an output in fluid communication with said accumulator and control cavities through the accumulator and control cavity feed conduits so as to substantially simultaneously and periodically provide pressurized fuel at about the same pressure level to said accumulator and control cavities and to periodically at least partially depressurize at least a portion of said accumulator cavity feed conduit for a substantial portion of the combustion cycle, said pressure level being sufficient for the upward force of accumulator pressure on said needle to overcome said spring-biasing but for the downward force of control cavity pressure on said needle;
(D) a cam lobe, mounted directly on the engine crankshaft, which reciprocates the plunger of said pump so that the pump pressure output produced by said plunger rises from a predetermined low pressure to a predetermined peak pressure;
(E) a pressure relief valve comprising a spring-biased closure device in fluid communication with said pump output and set to pressure-relieve said pump output at a maximum pressure slightly below said peak pressure so as to assure a uniform pressurization of said accumulator cavity and said control cavity despite manufacturing tolerances;
(F) means for varying the spring biasing force on said closure device so as to vary said pump output maximum pressure; and
(G) a two-way solenoid-actuated vent valve, in fluid communication with said control cavity, for periodically venting fuel pressure from said control cavity, whereby upon such venting said upward force of accumulator pressure on said needle overcomes said downward forces on said needle and raises said needle to an open position for injection of fuel from said accumulator injector directly into the cylinder.

105. A two-cycle internal combustion engine which comprises:
(A) an accumulator-type fuel injector mounted in said two-cycle engine and arranged for direct in-cylinder injection, said injector having
  (1) a needle normally spring-biased downwardly to a closed position,
  (2) an accumulator cavity (a) located so as to provide an upward opening force on said needle when pressurized and (b) receiving pressurized fuel via an accumulator cavity feed conduit, and (3) a control cavity (a) located above said needle so as to provide a downward closing force on said needle when pressurized, and (b) receiving pressurized fuel via a control cavity feed conduit;
(B) a source of fuel;
(C) a reciprocating plunger type high pressure fuel pump having an input operatively connected to said fuel source and having an output in fluid communication with said accumulator and control cavities through the accumulator and control cavity feed conduits so as to substantially simultaneously and periodically provide pressurized fuel at about the same pressure level to said accumulator and control cavities and to periodically at least partially depressurize at least a portion of said accumulator cavity feed conduit for a substantial portion of the combustion cycle, said pressure level being sufficient for the upward force of accumulator pressure on said needle to overcome said spring-biasing but for the downward force of control cavity pressure on said needle;
(D) a cam lobe, mounted directly on the engine crankshaft, which reciprocates the plunger of said pump so that the pump pressure output produced by said plunger rises from a predetermined low pressure to a predetermined peak pressure;
(E) a fuel transfer pump means, operatively associated with said high pressure pump input, for boosting the pressure of fuel supplied to said pump input, said pump transfer means having a variable pressure output so as to vary the high pressure pump output pressure; and
(F) a two-way solenoid-actuated vent valve, in fluid communication with said control cavity, for periodically venting fuel pressure from said control cavity, whereby upon such venting said upward force of accumulator pressure on said needle overcomes said downward forces on said needle and raises said needle to an open position for injection of fuel from said accumulator injector directly into the cylinder.

106. A method of introducing fuel into a cylinder of a two-cycle engine, which comprises:
(A) providing an accumulator-type fuel injector in said two-cycle engine arranged for direct in-cylinder injection, said injector having a needle normally spring-biased downwardly to a closed position, an accumulator cavity located so as to provide an upward opening force on said needle when pressurized, and a control cavity above said needle located so as to provide a downward closing force on said needle when said control cavity is pressurized;
(B) translating a plunger of a pump in a first direction to substantially simultaneously pressurize said accumulator and control cavities with fuel through respective accumulator and control cavity feed conduits to about the same pressure level above that which would be sufficient for the upward force of accumulator pressure on said needle to overcome said spring biasing but for the downward force of control cavity pressure on said needle;
(C) reversing the direction of pump plunger movement to at least partially depressurize said accumulator cavity feed conduit for a substantial portion of the combustion cycle while preventing unrestricted return fuel flow through said accumulator cavity feed conduit from said accumulator cavity, wherein the motion of said plunger, when plotted against time, generally follows a sine curve having a period equal to a sine curve followed by the engine piston; and
(D) venting fuel pressure from said control cavity via operation of a two-way solenoid-actuated vent valve in communication with said control cavity so that said upward force of accumulator pressure on said needle overcomes said downward forces on said needle and raises said needle to an open position for injection of fuel from said accumulator injector directly into the cylinder, wherein both the timing and quantity of fuel injection are dependent upon the timing of solenoid valve opening relative to pump plunger position.

107. A method of introducing fuel into a cylinder of a two-cycle engine, which comprises:
(A) providing an accumulator-type fuel injector in said two-cycle engine arranged for direct in-cylinder injection, said injector having a needle normally spring-biased downwardly to a closed position, an accumulator cavity located so as to provide an upward opening force on said needle when pressurized, and a control cavity above said needle located so as to provide a downward closing force on said needle when said control cavity is pressurized;
(B) translating a plunger of a pump in a first direction to substantially simultaneously pressurize said accumulator and control cavities with fuel through respective accumulator and control cavity feed conduits to about the same pressure level above that which would be sufficient for the upward force of accumulator pressure on said needle to overcome said spring biasing but for the downward force of control cavity pressure on said needle;
(C) reversing the direction of pump plunger movement to at least partially depressurize said accumulator cavity feed conduit for a substantial portion of the combustion cycle while (1) preventing unrestricted return fuel flow through said accumulator cavity feed conduit from said accumulator cavity (2) permitting return fuel flow through said control cavity feed conduit from said control cavity; and
(D) venting fuel pressure from said control cavity so that said upward force of accumulator pressure on said needle overcomes said downward forces on said needle and raises said needle to an open position for injection of fuel from said accumulator injector directly into the cylinder, wherein both the timing and quantity of fuel injection are dependent upon the timing of solenoid vent valve opening relative to pump plunger position, said venting step being performed via at least one of (1) operation of a two-way solenoid-actuated vent valve in communication with said control cavity, and (2) pump plunger reversal.

108. A two-cycle internal combustion engine, which comprises:
(A) an accumulator-type fuel injector mounted in the two-cycle engine and arranged for direct in-cylinder injection, said injector having a needle normally spring-biased downwardly to a closed position, an accumulator control cavity located so as to provide an upward opening force on said needle when pressurized, and a control cavity above said needle located so as to provide a downward closing force on said needle when pressurized;

(B) a source of fuel;

(C) a high pressure fuel pump having an input operatively connected to said fuel source and having an output in fluid communication with said accumulator and control cavities through respective accumulator and control cavity feed conduits so as to substantially simultaneously and periodically provide pressurized fuel at about the same pressure level to said accumulator and control cavities and to periodically at least partially depressurize at least a portion of said accumulator cavity feed conduit for a substantial portion of the combustion cycle, said pressure level being sufficient for the upward force of accumulator pressure on said needle to overcome said spring-biasing but for the downward force of control cavity pressure on said needle, said accumulator cavity feed conduit having a flow restriction device located therein to prevent unrestricted return fuel flow therethrough from said accumulator cavity when said accumulator cavity feed conduit is depressurized;

(D) a two-way solenoid-actuated vent valve, in fluid communication with said control cavity, for periodically venting fuel pressure from said control cavity, whereby upon such venting said upward force of accumulator pressure on said needle overcomes said downward forces on said needle and raises said needle to an open position for injection of fuel from said accumulator injector directly into the cylinder, wherein said pump comprises a mechanically actuated reciprocating plunger pump driven by an eccentric circular cam which is mounted directly on the engine crankshaft and which provides a motion to said plunger which, when plotted against time, generally follows a sine curve having a period equal to a sine curve followed by the engine piston; and (E) means for controlling energization of said solenoid vent valve such that the quantity of fuel injected and the timing of fuel injection are dependent upon the timing of solenoid vent valve opening relative to pump plunger position.

109. A method comprising (A) providing a single cylinder two-cycle engine;

(B) supplying pressurized fuel to a fuel injector having an injection nozzle communicating with said cylinder;

(C) electronically controlling said fuel injector to periodically inject fuel into said cylinder; and (D) selectively varying the power output of said engine by causing noninjection of fuel from said injector during a designated number of crankshaft cycles, wherein the number of crankshaft cycles skipped between each injection event decreases with an increase in the desired power output from said engine; wherein said fuel injector includes an accumulator-type fuel injector in the head of said engine arranged for direct in-cylinder injection, said injector having a needle normally spring-biased downwardly to a closed position, an accumulator cavity located so as to provide upward opening force on said needle when pressurized, and a control cavity above said needle located so as to provide downward closing force on said needle when pressurized; wherein said injecting step includes substantially simultaneously pressurizing said accumulator and control cavities with fuel through respective accumulator and control cavity feed conduits to about the same pressure level above that which would be sufficient for the upward force of accumulator pressure on said needle to overcome said spring biasing but for the downward force of control cavity pressure on said needle, and then venting fuel pressure from said control cavity via operation of a two-way solenoid-actuated vent valve in communication with said control cavity so that said upward force of accumulator pressure on said needle overcomes said downward forces on said needle and raises said needle to an open position for injection of fuel from said accumulator injector directly into the cylinder; and wherein said step of causing noninjection comprises electronically controlling said solenoid vent valve.

110. A method as defined in claim 109, further comprising maintaining a generally constant volume of injected fuel during each injection event at all engine output power settings.

* * * * *